US 7,949,796 B2

(12) United States Patent
Uno

(10) Patent No.: US 7,949,796 B2
(45) Date of Patent: *May 24, 2011

(54) DEVICE AND FILE TRANSFER SYSTEM

(75) Inventor: Fumitoshi Uno, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 457 days.

This patent is subject to a terminal disclaimer.

(21) Appl. No.: 12/202,965

(22) Filed: Sep. 2, 2008

(65) Prior Publication Data

US 2009/0234797 A1    Sep. 17, 2009

(30) Foreign Application Priority Data

Aug. 30, 2007   (JP) .................................. 2007-224801

(51) Int. Cl.
*G06F 3/00* (2006.01)
*G06F 13/12* (2006.01)

(52) U.S. Cl. .................... 710/14; 710/8; 710/36; 710/62

(58) Field of Classification Search ................ 710/8, 14, 710/36, 62
See application file for complete search history.

(56) References Cited

U.S. PATENT DOCUMENTS

| 2005/0023339 | A1* | 2/2005 | Uno | 235/375 |
| 2006/0221718 | A1* | 10/2006 | Ono | 365/189.04 |
| 2007/0245055 | A1* | 10/2007 | Minami | 710/305 |

FOREIGN PATENT DOCUMENTS

| JP | 2000-148651 | 5/2000 |
| JP | 2000-207322 | 7/2000 |
| JP | 2004-94493 | 3/2004 |
| JP | 2006-331088 | 12/2006 |
| JP | 2007-200235 | 8/2007 |

OTHER PUBLICATIONS

Japanese Official Action dated Jul. 14, 2009, together with an English-language translation.
U.S. Office Action dated May 28, 2010.

* cited by examiner

*Primary Examiner* — Alford W Kindred
*Assistant Examiner* — David E Martinez
(74) *Attorney, Agent, or Firm* — Scully, Scott, Murphy & Presser, P.C.

(57) ABSTRACT

A device is connectable to a computer using a data string based on the SCSI standard. The device includes a mode switching section configured to switch the device to one of a first mode and a second mode in which an access to the storage device with a standard SCSI commands is permitted and prohibited, respectively. When the standard SCSI command is received and the device is in the first mode, the physical storage area of the data storage section is accessed on the basis of the SCSI command. When the standard SCSI command is received and the device is in the second mode, a pseudo response is transmitted to the computer, which indicates that no storage medium is mounted. When a particular SCSI command is received, the file is accessed through a file system provided in the device based on the particular SCSI command.

11 Claims, 25 Drawing Sheets

DEVICE AND FILE TRANSFER SYSTEM

CROSS-REFERENCE TO RELATED APPLICATIONS

This application is based upon and claims priority from Japanese Patent Application No. 2007-224801 filed on Aug. 30, 2007, the entire contents of which are incorporated herein by reference.

TECHNICAL FIELD

The present invention relates to a device that functions as a storage device capable of being controlled by a computer according to SCSI commands defined in the SCSI standard, and to a file transfer system including a device and a computer.

BACKGROUND

As a USB (Universal Serial Bus) connectable flash memory card reader/writer, a USB storage type (based on the USB Mass Storage Class) is predominantly the mainstream, and there are hardly other types.

A USB connectable multi function device having the card reader/writer function and other functions (for example, a multi function device having a printer or scanner function) is also modeled after the stand-alone card reader/writer.

For this reason, in most models, the card reader/writer function is recognized by the PC (personal computer) as a USB storage type device.

Meanwhile, in a multi function device having the card reader/writer function, if an internal controller of a multi function device and a PC connected to the multi function device simultaneously access the memory card, many problems may occur.

Accordingly, in order to resolve these problems, JP-A-2004-94493 describes a technology that enables the internal controller of the multi function device and the PC connected to the multi function device to exclusively access the memory card.

However, if the access to the memory card is simply exclusively executed as described above, the memory card tends to be easily occupied by the PC for a comparatively long time. For this reason, the internal controller of the multi function device is liable to go into the situation that cannot access the memory card. Then, a user who frequently uses the multi function device as a stand-alone device may feel inconvenience of using the multi function device.

The reason why the PC occupies comparatively long time is that the PC and the internal controller of the multi function device access the memory card by different access methods. The details are as follows. First, an access from the PC to the memory card will be described. When accessing a file on the USB storage device, the PC accesses the memory card through a file system provided therein.

At this time, a request to access a physical storage area in the memory card (for example, a request to read data from the physical storage area or a request to write data to the physical storage area) is input from the PC to the multi function device. Meanwhile, no explicit notification indicating that the access from the PC to the memory card is completed is input from the file system provided in the PC.

Accordingly, the device can only guess that "if the PC does not access until a predetermined standby time elapses, the access from the PC is recognized as being completed". As a result, for the standby time, the access authority to the memory card is wastefully occupied by the PC.

Next, an access from the internal controller of the multi function device will be described. The internal controller of the multi function device accesses the memory card through a file system provided in the device.

At this time, if the access to the memory card by the file system provided in the device is completed, the internal controller of the multi function device can immediately recognize that the access to the memory card is completed. In this case, therefore, unlike the access from the PC, the device does not need to stand by until the standby time elapses, and thus there is no case in which the internal controller of the multi function device wastefully occupies the access authority to the memory card.

In this case, it should not be interpreted that the access request from the PC is intentionally preferentially processed. In the event, however, due to the difference in the access method, the occupation time by the PC is likely to be extended, and the internal controller of the multi function device is likely to go into the situation that cannot access the memory card.

SUMMARY

One aspect of the invention has been conceived in view of the above circumstances and has an object to provide a device which is capable of rapidly processing an access request from an internal controller of the device while an access request is input from a PC and another object to provide a file transfer system comprising such a device.

According to an aspect of the invention, there is provided a device that is connectable to a computer through a communication interface capable of transmitting a data string based on the SCSI (Small Computer System Interface) standard, and functions as a storage device capable of being controlled by the computer according to SCSI commands defined in the SCSI standard, the device comprising: a data storage section configured to access a data storable physical storage area, and read data stored in the physical storage area or write data to the physical storage area; a file system configured to manage data to be stored in the physical storage area of the data storage section as a file, provide an interface for accessing to the file, and enable reading of data stored in the file or writing of data to the file by an access with the interface; a data processing section configured to execute a predetermined data processing, and during the data processing, access the file through the file system; a mode switching section configured to, when several kinds of commands previously selected from among the SCSI commands are defined as particular SCSI commands, and other commands than the particular SCSI commands are defined as standard SCSI commands, switch the device to one of a first mode in which an access to the storage device with the standard SCSI commands is permitted and a second mode in which an access to the storage device with the standard SCSI commands is prohibited; a data analysis section configured to, when an SCSI command from the computer is transmitted through a logical data transmission line between the computer and the storage device, analyze whether the SCSI command is a standard SCSI command or a particular SCSI command; a mode determination section configured to, when the data analysis section analyzes that the SCSI command is a standard SCSI command, determine which of the first and second modes is selected by the mode switching section; a physical area unit access section configured to, when the mode determination section determines that the device is switched to the first mode, accesses the physical storage area of the data storage section on the basis of the SCSI command, and transmits response data corresponding to the access to the computer through the data transmission line; a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the SCSI command is a particular SCSI command, access the file through the file system on the basis of the particular SCSI command, and transmit response data corresponding to the access to the computer through the data transmission line.

According to another aspect of the invention, there is provided A file transfer system, comprising: a computer; and a device connected to the computer through a USB interface. The device comprises: a data storage section configured to access a data storable physical storage area, and read data stored in the physical storage area or write data to the physical storage area; a file system configured to manage data to be stored in the physical storage area of the data storage section as a file, provide an interface for accessing to the file, and enable reading of data stored in the file or writing of data to the file by an access with the interface; a data processing section configured to execute a predetermined data processing, and during the data processing, access the file through the file system; a mode switching section configured to, when several kinds of commands previously selected from among the SCSI commands are defined as particular SCSI commands, and other commands than the particular SCSI commands are defined as standard SCSI commands, switch the device to one of a first mode in which an access to the storage device with the standard SCSI commands is permitted and a second mode in which an access to the storage device with the standard SCSI commands is prohibited; a data analysis section configured to, when an SCSI command from the computer is transmitted through a logical data transmission line between the computer and the storage device, analyze whether the SCSI command is a standard SCSI command or a particular SCSI command; a mode determination section configured to, when the data analysis section analyzes that the SCSI command is a standard SCSI command, determine which of the first and second modes is selected by the mode switching section; a physical area unit access section configured to, when the mode determination section determines that the device is switched to the first mode, accesses the physical storage area of the data storage section on the basis of the SCSI command, and transmits response data corresponding to the access to the computer through the data transmission line; a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the SCSI command is a particular SCSI command, access the file through the file system on the basis of the particular SCSI command, and transmit response data corresponding to the access to the computer through the data transmission line. The computer comprises a server computer that is capable of transmitting a file to a client computer having a client function, and on the basis of an access request from the client computer, the computer is configured to transmit the access request to the file unit access section provided in the device through the data transmission line and to transmit the response data from the device according to the access request to the client computer.

DESCRIPTION

Figure 1:
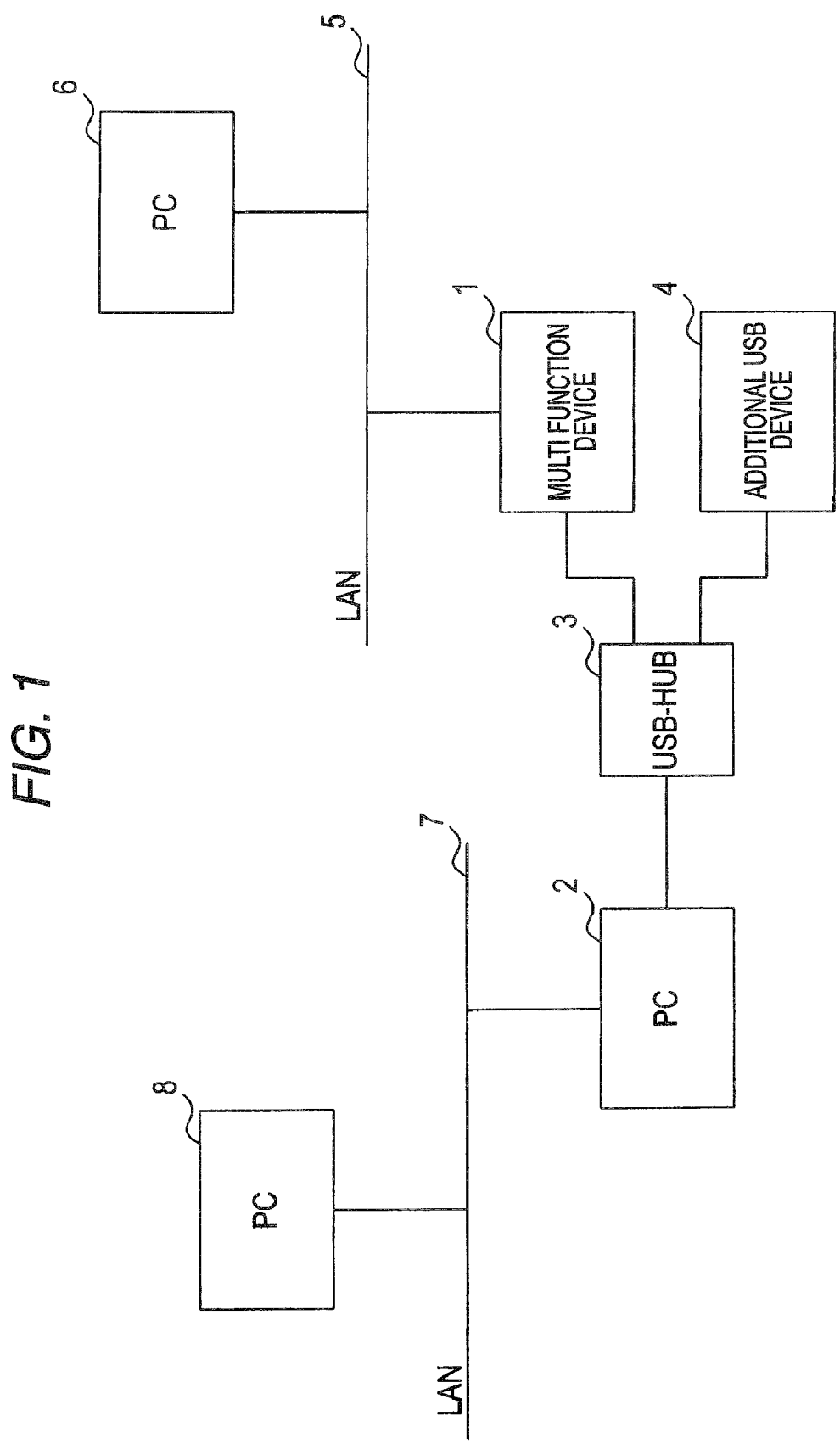
FIG. 1 is a block diagram of an entire file transfer system according to a first embodiment of the invention.

Hereinafter, the configurations according to aspects of the invention will be described.

According to a first aspect of the invention, there is provided a device that is connectable to a computer through a communication interface capable of transmitting a data string based on the SCSI (Small Computer System Interface) standard, and functions as a storage device capable of being controlled by the computer according to SCSI commands defined in the SCSI standard, the device comprises: a data storage section that accesses a data storable physical storage area, and reads data stored in the physical storage area or writes data to the physical storage area; a file system that manages data to be stored in the physical storage area of the data storage section as a file, provides an interface for accessing to the file, and enables reading of data stored in the file or writing of data to the file by an access with the interface; a data processing section that executes a predetermined data processing, and during the data processing, accesses the file through the file system; a mode switching section that, when several kinds of commands previously selected from among the SCSI commands are defined as particular SCSI commands, and other commands than the particular SCSI commands are defined as standard SCSI commands, switches the device to one of a first mode in which an access to the storage device with the standard SCSI commands is permitted and a second mode in which an access to the storage device with the standard SCSI commands is prohibited; a data analysis section that, when an SCSI command from the computer is transmitted through a logical data transmission line between the computer and the storage device, analyzes whether the SCSI command is a standard SCSI command or a particular SCSI command; a mode determination section that, when the data analysis section analyzes that the SCSI command is a standard SCSI command, determines to which of the first mode or the second mode the mode switching section switches the device; a physical area unit access section that, when the mode determination section determines that the device is switched to the first mode, accesses the physical storage area of the data storage section on the basis of the SCSI command, and transmits response data corresponding to the access to the computer through the data transmission line; a pseudo response section that, when the mode determination section determines that the device is switched to the second mode, transmits to the computer through the data transmission line a pseudo response indicating that no storage medium is mounted to the data storage section; and a file unit access section that, when the data analysis section analyzes that the SCSI command is a particular SCSI command, accesses the file through the file system on the basis of the particular SCSI command, and transmits response data corresponding to the access to the computer through the data transmission line.

In this device, the "communication interface capable of transmitting the data string based on the SCSI standard" comprises a SCSI interface and various kinds of communication interfaces, which internally transmit a data string based on the SCSI standard.

According to a second aspect of the invention, the communication interface may be a USB interface. That is, the USB interface is configured to internally transmit a data string based on the SCSI standard when being connected to a USB storage device.

Instead of the USB interface, for example, when an ATAPI (AT Attachment Packet Interface)-compliant device is connected to an IDE (Integrated Drive Electronics) controller, a data string is internally transmitted based on the SCSI standard.

Alternatively, a communication interface, such as IEEE 1394 (Institute of Electrical and Electronic Engineers 1394), is also configured to internally transmit a data string based on the SCSI standard.

These communication interfaces serve as examples of the "communication interface capable of transmitting the data string based on the SCSI standard" in the aspects of the invention. In the following description, storage devices that communicate with a computer through the communication interfaces based on the SCSI standard are collectively referred to as a SCSI-type storage device.

In the following description, a multi function device having a function as the SCSI type storage device and a function as an additional device is also regarded as being comprised by the SCSI type storage device insofar as it is not necessary to particularly distinguish them from each other.

According to a third aspect of the invention, the device may be a device that, when being connected to the computer through the USB interface, is recognized by the computer as a "USB multi function device capable of functioning as multiple devices comprising at least a USB storage device" or a "USB storage device". These devices serve as examples of the SCSI type storage device in the aspects of the invention.

If the device is connected to the computer through the communication interface, and a driver or the like required for data communication with the device is loaded, a logical data transmission line is constituted between the computer and the device. After such a data transmission line is constituted, the computer can transmit the SCSI commands defined in the SCSI standard according to a communication procedure based on the SCSI standard.

On this assumption, in the device of the aspects of the invention, the computer is configured to use two access methods when accessing the SCSI type storage device by using the SCSI commands defined in the SCSI standard.

A first access method is a method that enables an access to the SCSI type storage device through a file system provided in the computer. A second access method is a method that enables an access to the SCSI type storage device through a file system in the device.

The first access method is generally used in the SCSI type storage device. In this case, a SCSI command (a standard SCSI command in the aspects of the invention) for accessing the physical storage area of the data storage section in the device is transmitted from the computer.

The second access method is uniquely used in the device of the aspects of the invention. In this case, a SCSI command (particular SCSI command in the aspects of the invention) which is not used in the first access method is transmitted from the computer. The particular SCSI command is a command that uniquely defines a function in the device of the aspects of the invention based on the SCSI standard.

The device is configured to determine which of the two access methods is used on the basis of whether the particular SCSI command is transmitted or not. Specifically, when the standard SCSI command is transmitted, the SCSI command is handled as data for accessing the SCSI type storage device as defined in the SCSI standard.

When the particular SCSI command is transmitted, a uniquely defined processing is executed. As one of the uniquely defined processing, a processing to access a file through a file system of the device is executed.

With this configuration, when the particular SCSI command is transmitted from the computer to the device, unlike a case in which the standard SCSI command is transmitted, an access can be made through the file system in the device. In addition, the data processing section in the device accesses a file through the file system in the device when a predetermined data processing is executed.

That is, an access request from the computer and an access request from the data processing section in the device are both processed through the file system in the device. Therefore, unlike a usual SCSI type storage device, it is necessary to stand by for a predetermined standby time so as to determine whether or not the access from the computer is completed, and thus there is no case in which the access authority to the data storage section is wastefully occupied by the computer.

Accordingly, as for the access request from the computer and the access request from the data processing section in the device, immediately after one access request is processed, the other one can be processed. As a result, a rapid processing can be achieved.

In addition, even if the access request from the computer and the access request from the data processing section in the device are simultaneously generated, both requests are appropriately managed and processed by the file system in the device.

Accordingly, unlike a case in which an access request to a storage device through a file system in the computer and an access request from the data processing section in the device are simultaneously generated, even if a plurality of access requests are simultaneously generated, the requests can be processed seemingly simultaneously or in parallel without any problems under the control of the file system in the device.

In addition, the device of the aspects of the invention is configured to be switched between a first mode in which an access to the storage device with the standard SCSI commands is permitted and a second mode in which an access to the storage device with the standard SCSI commands is prohibited.

For this reason, when the computer accesses the device and the standard SCSI command is transmitted from the computer, if the device is switched to the first mode, an access from the computer to the device is permitted. In this case, the device functions in the same manner as a usual SCSI device.

Meanwhile, when the computer accesses the device and the standard SCSI command is transmitted from the computer, if the device is switched to the second mode, an access from the computer to the device is prohibited. In this case, a pseudo response indicating that no storage medium is mounted to the data storage section is transmitted to the computer.

By returning such a response, while connection between the computer and the device is maintained, an access to the device with the standard SCSI command can be blocked. In this state, the particular SCSI command is used for an access from the computer to the device, and accordingly the computer can access a file in the device through the file system in the device.

That is, whichever of the first mode and the second mode the device is switched to, connection between the computer and the device is maintained, and accordingly, the logical data transmission line capable of transmitting SCSI data is also maintained.

If the device is in the first mode, the device functions as a usual SCSI type storage device. Meanwhile, if the device is in the second mode, the functions of the usual SCSI type storage device are invalidated, except for a function to return a response indicating that no storage medium is set. Accordingly, if the device is in the second mode, the particular SCSI command can be used.

With this configuration, if the device is switched to the first mode, the device can function as the usual SCSI device. Therefore, many commercially available applications compliant with the SCSI type storage device can be used without any problems.

In addition, if the device is switched to the second mode, the access request from the computer and the access request from the data processing section in the device can be both rapidly processed.

Therefore, according to a users intention, for example, when the function as the SCSI device is emphasized, the device may be switched to the first mode, and when the user wants to rapidly process the function of the data processing section in the device, the device may be switched to the second mode.

In addition, whichever of the first mode and the second mode the device is switched to, as the data transmission line between the computer and the device, a single data transmission line based on the SCSI standard may be used. Therefore, communication interfaces do not need to be provided separately for the first mode and the second mode, and accordingly the configuration of the device (particularly, hardware) can be simplified. Therefore, the device can be provided at low cost, as compared with a case in which communication interfaces are provided separately for the first and second mode.

According to a fourth aspect of the invention, in the device according to the first to third aspects of the invention, the data analysis section may comprise a file access request determination section that determines whether or not the particular SCSI command is a "SCSI command requesting an access to the file". In this case, when the file access request determination section determines that the particular SCSI command is the "SCSI command requesting an access to the file, the file unit access section may access the file through the file system, and transmits response data corresponding to the access to the computer to the data transmission line.

With this configuration, as the particular SCSI commands, a command to request an access to a file and other commands can be used. Therefore, when an access to a file is requested and other controls are directed to the device, the particular SCSI command can be used.

According to a fifth aspect of the invention, in the device according to the fourth aspect of the invention, when a SCSI command to be transmitted from the computer through the data transmission line is one of a "Write Buffer" command and a "Read Buffer" command, the file access request determination section may determine that the SCSI command is the "SCSI command requesting an access to the file".

With this configuration, the computer can assign whether to perform an access through the file system in the computer or an access through the file system in the device according to which of the "Write Buffer" command and the "Read Buffer" command is used.

According to a sixth aspect of the invention, in the device according to the fourth or fifth aspect of the invention, the data analysis section may comprise a mode switching request determination section that determines whether or not the particular SCSI command is a "SCSI command requesting the mode switching section of mode switching. In this case, when the mode switching request determination section determines that the particular SCSI command is the "SCSI command requesting to switch the mode, the mode switching section may switch the device to one of the first mode and the second mode on the basis of information in a data string constituting the particular SCSI command.

With this configuration, as the particular SCSI commands, a SCSI command requesting an access to a file and a SCSI command requesting to switch the mode can be used. Therefore, when an access to a file is requested and when the computer requests the device to switch the mode, the particular SCSI command can be used.

According to a seventh aspect of the invention, in the device according to the sixth aspect of the invention, when a SCSI command to be transmitted from the computer through the data transmission line is an "Inquiry" command, the value of an "EVPD (Enable Vital Product Data)" region in a data string constituting the "Inquiry" command is set to "1", the value of a "Page Code" region in the data string constituting the "Inquiry" command is set to a prescribed value, and a prescribed bit of an "Allocation Length" region in the data string constituting the "Inquiry" command is set to "1", the mode switching request determination section may determine that the SCSI command is the "SCSI command requesting to switch the mode".

The "Inquiry" command is basically prepared to enable the computer to acquire information from the SCSI device. Specifically, when the value of the "EVPD (Enable Vital Product Data)" region in the data string constituting the "Inquiry" command is set to "1", and the value of the "Page Code" region in the data string constituting the "Inquiry" command is set to a prescribed value, the computer can acquire VPD (Vital Product Data) information corresponding to the "Page Code" from the SCSI device.

The data length of the VPD information (hereinafter, referred to as "data length S1") may be arbitrarily determined to be a maximum of 255 bytes. In addition, when the computer acquires the VPD information, in the "Allocation Length" in the data string constituting the "Inquiry" command, the buffer size for acquiring the VPD information (hereinafter, referred to as "buffer size S2") is assigned as 1-byte (8-bit) data.

Accordingly, if the buffer size S2 is equal to or more than the data length S1, the VPD information can be acquired without missing. Therefore, if the buffer size S2 has a value larger than the data length S1, there is no problem in acquiring the VPD information.

For this reason, for example, when the data length S1 can be expressed by lower n bits (where n<8), the buffer size S2 can have a value larger than the data length S1, regardless of the value of each bit, insofar as the upper (8-n) bits are not all set to "0", and thus there is no problem in acquiring the VPD information. In addition, even if the upper (8-n) bits are all set to "0", when the value of the lower n bits is equal to or more than the data length S1, there is no problem in acquiring the VPD information.

With this feature, in the device according to the seventh aspect of the invention, if each of the bits in the "Allocation Length" region has a meaning within a limit that the buffer size S2 has a value larger than the data length S1, the region is used as a region for information transmission from the computer to the device.

Accordingly, when a prescribed bit in the "Allocation Length" region is set to "1", the "Inquiry" command functions as a "SCSI command requesting to switch the mode", other than the intrinsic function of the "Inquiry" command.

That is, when the "Inquiry" command is input from the computer, in order to implement the intrinsic function of the "Inquiry" command, the device returns the VPD information to the computer, but determines whether or not the prescribed bit in the "Allocation Length" region is set to "1".

When the prescribed bit in the "Allocation Length" region is set to "1", the device is switched to one of the first mode and the second mode according to a meaning allocated to that bit.

With this configuration, the mode change of the device to one of the first mode and the second mode can be instructed by using the "Inquiry" command from the computer to the device.

According to an eighth aspect of the invention, in the device according to any one of the first to seventh aspects of the invention, the device may be a multi function device having at least a printer function and a memory card function, and the data processing section may be adapted to execute a data processing to print an image on the basis of image data read from a file on a memory card, and during the data processing, access the file through the file system.

With this device, when the device is switched to the first mode, the device, that is, the multi function device can function as a USB storage device. In addition, when the device is switched to the second mode, while a file access from the computer is permitted (that is, the card reader function is kept to be available), to have a "function to print a file on the memory card" by the data processing section in the device becomes available.

According to a ninth aspect of the invention, in the device according to any one of the first to seventh aspects of the invention, the device may be a digital camera having at least a still image capturing function, and the data processing section may be adapted to execute a data processing to write a captured still image to a file on a memory, and during the data processing, access the file through the file system.

With this device, when the device is switched to the first mode, the device which is the digital camera can function as a USB storage device. In addition, when the device is switched to the second mode, while a file access from the computer is permitted (that is, the card reader function is kept to be available), a function to capture a still image by the data processing section in the device becomes available.

According to a tenth aspect of the invention, in the device according to any one of the first to seventh aspects of the invention, the device may be a portable audio player having at least a music reproducing function, and the data processing section may be adapted to execute a data processing to reproduce music on the basis on audio data read from a file on a memory, and during the data processing, access the file through the file system.

With this device, when the device is switched to the first mode, the device which is the potable audio player functions as a USB storage device. In addition, when the device is switched to the second mode, while a file access from the computer is permitted (that is, the card reader function is kept to be available), a function to reproduce music by the data processing section in the device becomes available.

According to an eleventh aspect of the invention, a file transfer system comprises a computer and the device according to any one of the first to tenth aspects of the invention, the device being connected to the computer through a USB interface. The computer is a server computer that is capable of transmitting a file to a client computer having a client function, and on the basis of an access request from the client computer, the computer is adapted to transmit the access request to the file unit access section provided in the device through the data transmission line and to transmit the response data from the device according to the access request to the client computer.

With this file transfer system, the client computer can access a file on the device through the server computer. Therefore, a plurality of client computer can access a file on the device.

Next, illustrative embodiments of the invention will be described by way of specific examples.

(1) First Embodiment

First, a first embodiment will be described.
(Configuration of File Transfer System)
FIG. 1 is a block diagram of an entire file transfer system according to an embodiment of the invention.

The file transfer system primarily includes a multi function device 1 and a PC (Personal Computer) 2. The multi function device 1 and the PC 2 respectively have USB interfaces, and are connected with each other through a USB-HUB 3 so as to perform data transmission between them. To the USB-HUB 3, an additional USB device 4 and the like are also connected.

The multi function device 1 and the PC 2 respectively have LAN interfaces. The multi function device 1 can perform data transmission with a device connected to a LAN 5 (for example, PC 6), and the PC 2 can perform data transmission with a device connected to a LAN 7 (for example, a PC 8).

In this embodiment, the multi function device 1 is a multi function device having a printer function, a scanner function, a PC-FAX function, and a card reader function. These functions can be controlled by the PC 2.

(Internal Configuration of Multi Function Device)

Figure 2:
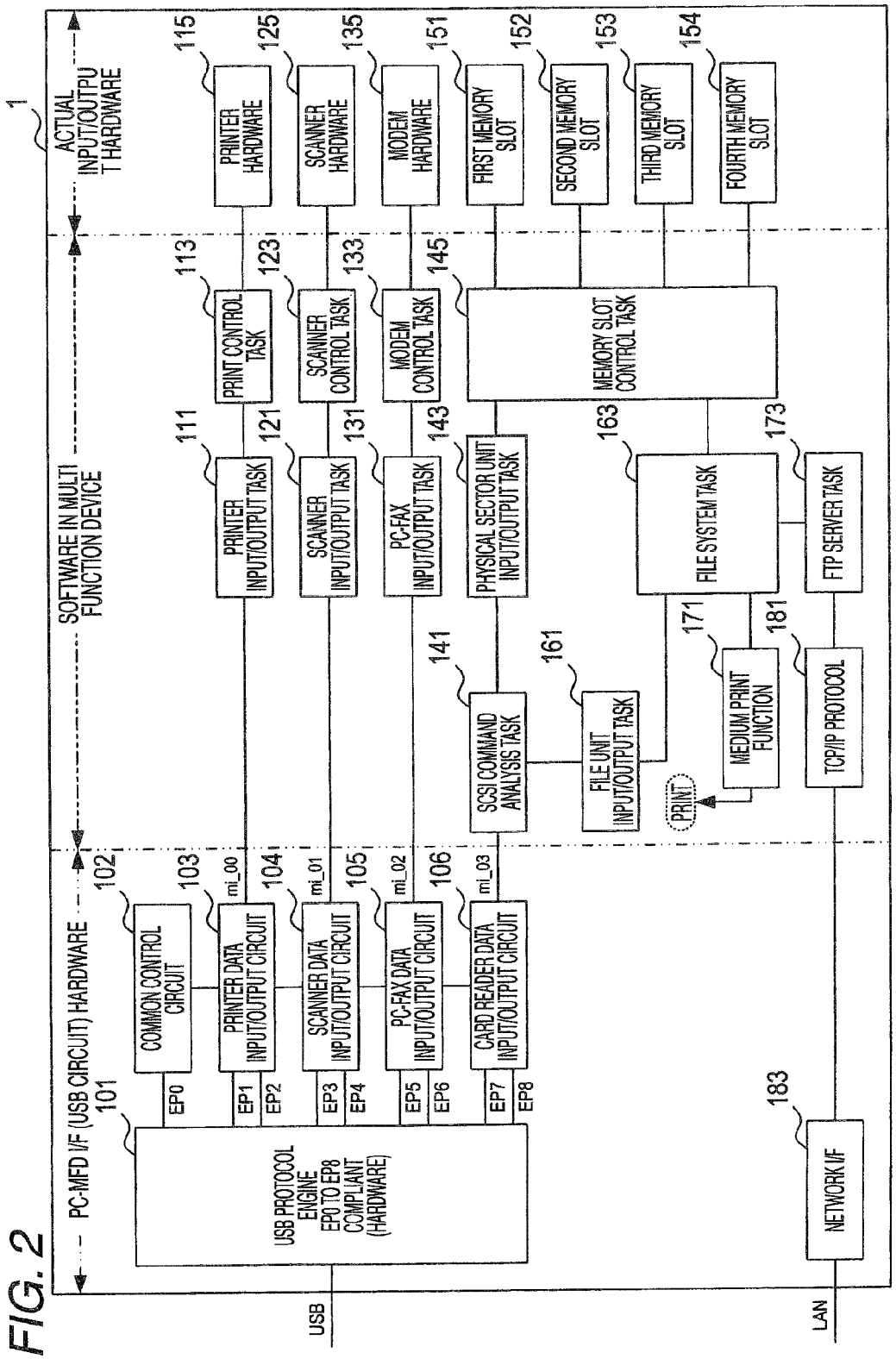
FIG. 2 is a block diagram showing the internal configuration of a multi function device.

FIG. 2 is a block diagram illustrating the internal configuration of the multi function device 1.

The multi function device 1 includes, as hardware constituting the USB interface, a USB protocol engine 101, a common control circuit 102, a printer data input/output circuit 103, a scanner data input/output circuit 104, a PC-FAX data input/output circuit 105, and a card reader data input/output circuit 106.

At the time of data transmission with the PC 2, data is transmitted according to the communication protocol based on the USB standard under the control of the USB protocol engine 101. The circuits are configured to perform data transmission with the PC 2 through an end point.

Specifically, the common control circuit 102 performs data input/output (two-way communication) with the PC 2 through an end point for protocol transfer (hereinafter, referred to as "EP0").

The printer data input/output circuit 103, the scanner data input/output circuit 104, the PC-FAX data input/output circuit 105, and the card reader data input/output circuit 106 perform data transmission with the PC 2 through an end point for input data and an end point for output data (hereinafter, referred to as "EP1 to EP8"), respectively.

When data is transmitted to the printer data input/output circuit 103, data is transmitted to a printer input/output task 111. Data which is transmitted to the printer input/output task 111 is then transmitted to a print control task 113, and thus printer hardware 115 is controlled by the print control task 113.

When data is transmitted to the scanner data input/output circuit 104, data is transmitted to the scanner input/output task 121. Data which is transmitted to the scanner input/output task 121 is then transmitted to a scanner control task 123, and thus scanner hardware 125 is controlled by the scanner control task 123.

When data is transmitted to the PC-FAX data input/output circuit 105, data is transmitted to a PC-FAX input/output task 131. Data which is transmitted to the PC-FAX input/output task 131 is then transmitted to a modem control task 133, and thus modem hardware 135 is controlled by the modem control task 133.

When data is transmitted to the card reader data input/output circuit 106, data is transmitted to a SCSI command analysis task 141.

The SCSI command analysis task 141 analyzes whether a SCSI command from the PC 2 belongs to preselected particular SCSI commands or standard SCSI commands other than the particular SCSI commands. Then, the SCSI command analysis task 141 sorts the SCSI command into one of two data processing systems according to the analysis result. The SCSI command analysis task 141 serves as an example of a data analysis section. A specific processing to be executed in the SCSI command analysis task 141 and a difference between the particular SCSI command and the standard SCSI command will be described below in detail.

When the SCSI command from the PC 2 is a standard SCSI command (the details will be described below), the SCSI command analysis task 141 distributes data to a physical sector unit input/output task 143. The physical sector unit input/output task 143 serves as an example of a physical area unit access section.

The physical sector unit input/output task 143 performs a processing to transmit received data to a memory slot control task 145. This processing will be described below in detail. The memory slot control task 145 controls a first memory slot 151, a second memory slot 152, a third memory slot 153, and a fourth memory slot 154.

Each of the first memory slot 151, the second memory slot 152, the third memory slot 153, and the fourth memory slot 154 allows a memory card to be mounted thereto. These memory card slots 151 to 154 may allow memory cards based on different standards to be mounted thereto, respectively. The first memory slot 151, the second memory slot 152, the third memory slot 153, and the fourth memory slot 154 serve as an example of a data storage section.

In this embodiment, the first memory slot 151, the second memory slot 152, the third memory slot 153, and the fourth memory slot 154 are exclusively available. For example, when a memory card is mounted to the first memory slot 151, other slots are not available until the memory card is removed.

When the SCSI command from the PC 2 is a file access related particular SCSI command (the details will be described below), the SCSI command analysis task 141 distributes data to a file unit input/output task 161. The file unit input/output task 161 serves as an example of a file unit access section.

The file unit input/output task 161 performs a processing to transmit received data to the memory slot control task 145 through a file system task 163. This processing will be described below in detail. The file system task 163 serves as an example of a file system.

If data is transmitted from the file unit input/output task 161 to the memory slot control task 145 through the file system task 163, the memory slot control task 145 also controls the first memory slot 151, the second memory slot 152, the third memory slot 153, and the fourth memory slot 154.

Meanwhile, when the SCSI command from the PC 2 is a mode related particular SCSI command (the details will be described below), the SCSI command analysis task 141 executes a processing to request the physical sector unit input/output task 143 for mode change or a processing to acquire a current mode. This processing will be described below in detail.

The multi function device 1 further includes a medium print function 171 and an FTP (File Transfer Protocol) server task 173. The medium print function 171 and the FTP server task 173 serve as an example of a data processing section, and control a function to be executed by the multi function device 1 as a stand-alone device independently from the PC 2.

Specifically, the medium print function 171 controls a function to read an image file from a memory card mounted to one of the first memory slot 151, the second memory slot 152, the third memory slot 153, and the fourth memory slot 154, and to print the image file.

When the medium print function 171 reads the image file, similarly to the file unit input/output task 161, data is transmitted to the memory slot control task 145 through the file system task 163. Accordingly, an access to the image file is executed.

When a device (for example, the PC 6) on the LAN 5 to which the multi function device 1 is connected requests an access to a file on a memory card mounted to one of the first memory slot 151, the second memory slot 152, the third memory slot 153, and the fourth memory slot 154, the FTP server task 173 processes the access request.

When the FTP server task 173 accesses a file, similarly to the file unit input/output task 161, data is transmitted to the memory slot control task 145 through the file system task 163. Thus, an access to the file is executed.

(Internal Configuration of PC)

Figure 3:
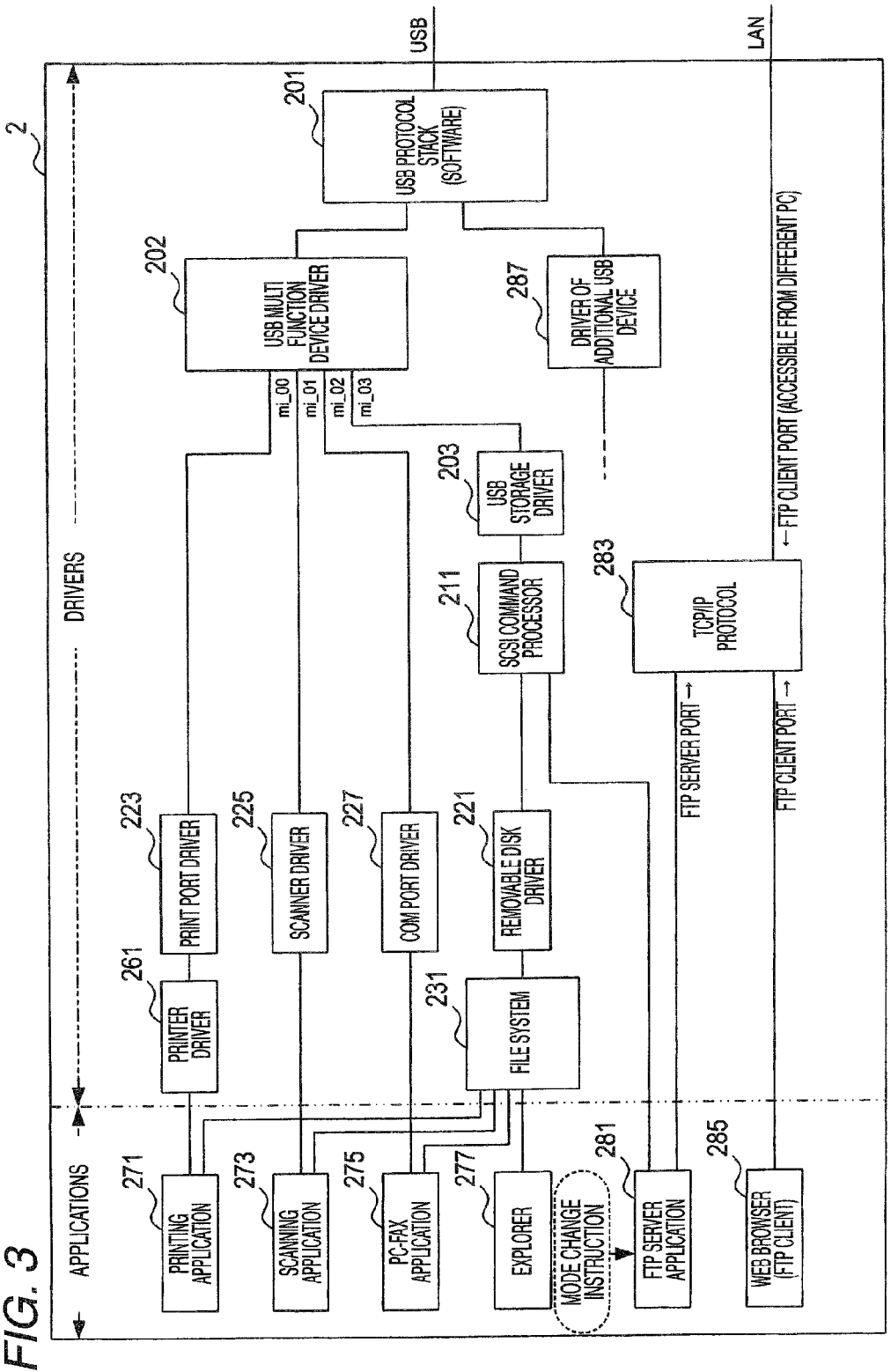
FIG. 3 is a block diagram showing the internal configuration of a PC.

FIG. 3 is a block diagram illustrating the internal configuration of the PC 2.

In the PC 2, as the standard functions based on the OS, a USB protocol stack 201, a USB multi function device driver 202, a USB storage driver 203, a SCSI command processor 211, a removable disk driver 221, and a file system 231 are operated.

In addition, in the PC 2, as exclusive-use software compliant with the multi function device 1, a print port driver 223, a scanner driver 225, a COM port driver 227, and a printer driver 261 are operated.

Furthermore, in the PC 2, as applications software using the functions, a printing application 271, a scanning application 273, and a PC-FAX application 275 are operated.

In this embodiment, as the OS in the PC 2, Windows (Registered Trademark) is used. Explorer 277, which is software comes with Windows (Registered Trademark), can operate on the PC 2. As the OS in the PC 2, an OS other than Windows (Registered Trademark) may be used insofar as the same functions can be implemented.

Furthermore, in the PC 2, an FTP server application 281 and a TCP/IP protocol 283 are operated. The FTP server application 281 is software that receives an access request from a WEB browser 285 which functions as an FTP client, and issues a file access request to the multi function device 1.

On the PC 2, a driver 287 of an additional USB device compliant with the additional USB device 4 can be operate.

(Outline of Multi Function Device and PC Functions)

The multi function device 1 can be switched to one of two modes according to a user's operation on the PC 2.

One mode is a USB storage mode (corresponding to a first mode; hereinafter, also referred to as "USB mode"). In this mode, an access from the PC 2 to a USB storage device is permitted.

In this case, the first memory slot 151, the second memory slot 152, the third memory slot 153, and the fourth memory slot 154 in the multi function device 1 function in the same manner as a usual USB storage device.

The other mode is an FTP server mode (corresponding to a second mode; hereinafter, also referred to as "FTP mode"). In this mode, an access from the PC 2 to a USB storage device is prohibited.

In this case, the first memory slot 151, the second memory slot 152, the third memory slot 153, and the fourth memory slot 154 in the multi function device 1 do not function in the same manner as a usual USB storage device. Specifically, even if a medium is mounted to any one of the memory slots 151 to 154, and the PC 2 tries to access the medium, the multi function device 1 only returns a response indicating that no medium is mounted.

However, when the multi function device 1 is switched to the FTP mode, an application compliant with the FTP mode may access the first memory slot 151, the second memory slot 152, the third memory slot 153, and the fourth memory slot 154 in the multi function device 1.

The application compliant with the FTP mode issues to the multi function device 1 a SCSI command (a particular SCSI command), which is different from a SCSI command (a standard SCSI command) issued from a usual USB storage device compliant application to the multi function device 1. This will be described below in detail.

The multi function device 1 analyzes whether a SCSI command from the PC 2 is a standard SCSI command or a particular SCSI command. When the SCSI command from the PC 2 is a standard SCSI command, the SCSI command is processed as a SCSI command for the USB storage device. Specifically, the standard SCSI command is transmitted to the physical sector unit input/output task 143, such that an access to the medium is executed in physical sector unit.

If the SCSI command from the PC 2 is a particular SCSI command, the SCSI command is processed differently from the SCSI command for the USB storage device. Accordingly, an access to each slot is achieved. Specifically, if the SCSI command is one of a "Write Buffer" command and a "Read Buffer" command, the SCSI command is transmitted to the file unit input/output task 161, such that an access to the medium is executed in file unit through the file system task 163.

A section for switching the multi function device 1 to one of the modes serves as an example of a mode switching section.

(Specification and Transmission Method of Standard SCSI Command and Particular SCSI Command)

Next, the specification and transmission method of the standard SCSI command and the particular SCSI command will be described.

When the SCSI command is one of the "Write Buffer" command and the "Read Buffer" command, the multi function device 1 determines that the SCSI command is a particular SCSI command requesting an access to a file.

When the SCSI command is an "Inquiry" command, the value of an "EVPD" region in a data string constituting the "Inquiry" command is set to "1", the value of a "Page Code" region in the data string constituting the "Inquiry" command, and a prescribed bit in an "Allocation Length" region in the data string constituting the "Inquiry" command is set to "1", the multi function device 1 determines that the SCSI command is a particular SCSI command requesting to switch the mode or to acquire a current mode.

Other SCSI commands than the particular SCSI commands are determined as standard SCSI commands.

Of the above particular SCSI commands, first, the "Write Buffer" command and the "Read Buffer" command will be described.

In this embodiment, the "Write Buffer" command and the "Read Buffer" command are used in such a manner that a one-time file access is executed by a combination of two or three commands.

Specifically, first, when the "Write Buffer" command and the "Read Buffer" command are used, a "Buffer ID" region in a data string constituting each command is set to the following value.

0x80: File Access Command Output (ASCII Transfer)
0x81: File Access Data Output (Binary Transfer)
0x82: File Access Data Input (Binary Transfer)
0x83: File Access Status Input (ASCII Transfer)

It is assumed that as for the file access data output and the file access data input, binary data is transferred as it is, and as for file access command output and the file access status input, one or a plurality of character strings are transferred. As for the file access command output and the file access status input, when a numeric value is to be transferred, the numeric value is converted into a character string.

When one or a plurality of character strings are transferred, the data structure is defined as follows.

(First Character String) [0x00] (Second Character String) [0x00] (Third Character String) [0x00]

That is, each character string is terminated by the null [0x00]. When the null [0x00] is present subsequent to the null [0x00] for terminating the character string, it means that all the character strings are terminated.

When one or a plurality of character strings are transferred, the number of character strings varies by file access command or file access status, but at least one character string is constantly present.

In the file access command output, a first character string expresses a file access command. As the first character string, for example, a character string, such as fopen, fread, Write, fseek, or fclose, is used.

In the file access command output, a second character string and later express parameters. For example, in case of fopen, the second character string is a file name and the third character string is an open mode. In case of fclose, the second character string is a handle number (numeric value converted into character string). These parameters are based on the standard functions in the C language.

In the file access status input, the first character string is one of "0" and "1". Here, "0" represents failure and "1" represents success. In the file access status input, the second character string and later store return data other than the first character string.

For example, in case of fopen, if the first character string "0 (failure)", the second character string is none, and if the first character string is "1 (success)", the second character string is a handle number (numeric value converted into character string). In case of fclose, the second character string is none.

The "Write Buffer" command and the Read Buffer" command are used in combination of two or three commands. Accordingly, a command is transmitted from the PC 2 to the multi function device 1, and a response to the command is transmitted from the multi function device 1 to the PC 2.

Specifically, a file access (fopen, fseek, or fclose) having no mass data transmission is implemented with two SCSI commands of "Write Buffer/Buffer ID=0x80: File Access Command Output" and "Read Buffer/Buffer ID=0x83: File Access Status Input".

A file access command (fwrite) accompanied by mass data output is constituted from three SCSI commands of "Write Buffer/Buffer ID=0x80: File Access Command Output", "Write Buffer/Buffer ID=0x81: File Access Data Output", and "Read Buffer/Buffer ID=0x83: File Access Status Input".

In addition, a file access command (fread) accompanied by mass data input is constituted from three SCSI commands of "Write Buffer/Buffer ID=0x80: File Access Command Output", "Read Buffer/Buffer ID=0x82: File Access Data Input", and "Read Buffer/Buffer ID=0x83: File Access Status Input".

A specific procedure when the "Write Buffer" command and the Read Buffer" command are used in combination will be farther described in the description of a subsequent processing.

Next, the specification of the "Inquiry" command which is handled as a particular SCSI command in this embodiment will be described.

When the value of the "EVPD" region in the data string constituting the "Inquiry" command is set to "1", a SCSI device is adapted to return VPD information corresponding to the value of the "Page Code" region. The contents of the VPD information are defined in each SCSI device.

In this embodiment, the multi function device 1 is adapted to return 63-byte information as VPD information corresponding to a page code 0xc8. In the following description, for convenience, a command requesting the 63-byte VPD information is also called "VPD-Inquiry Page Code 0xc8".

When the "VPD-Inquiry Page Code 0xc8" is issued, the PC 2 may set a data size (a maximum of 255 bytes) to be received by the PC 2 in the "Allocation Length" region in the data string constituting the "Inquiry" command. If the data size is set to a value not less than the size of the VPD information, the VPD information can be acquired without missing.

In this embodiment, therefore, even if any value ranging from 63 to 255 is set in the "Allocation Length" region, 63-byte VPD information can be acquired without missing.

In this embodiment, it is assumed that when the value of the "Allocation Length" region is 63, no information is transmitted from the PC 2 to the multi function device 1, and when the value of the "Allocation Length" region is 64 or more, information is transmitted from the PC 2 to the multi function device 1.

That is, it is assumed that when the value of the "Allocation Length" region is 00111111 in binary, no information is transmitted from the PC 2 to the multi function device 1, and when the value of the "Allocation Length" region is 01xxxxxx or 1xxxxxxx (where x is one of 0 and 1) in binary, information is transmitted from the PC 2 to the multi function device 1.

This means that when the lowermost bit of the 8-bit "Allocation Length" region is bit0 and the uppermost bit of the "Allocation Length" region is bit7, if at least one of the upper two bits (bit7 and bit6) is "1", information is transmitted.

In addition, when at least one of the upper two bits (bit7 and bit6) is "1", the value is always not less than 64 (in decimal). Therefore, regardless of the value of each of the lower six bits (bit5 to bit0), there is no problem in acquiring the VPD information without missing.

That is, when the value of the "Allocation Length" region is 01xxxxxx or 1xxxxxxx, there is no problem in acquiring the VPD information without missing, regardless of x (0 or 1), and thus the PC 2 may arbitrarily set a desired value. In this embodiment each bit is defined as having the following meaning, and the PC 2 arbitrarily sets the value of each bit and transmits the value to the multi function device 1.

First, when the upper two bits (bit7 and bit6) are "00 (in binary)", it means that no information is transmitted from the PC 2 to the multi function device 1. When the upper two bits (bit7 and bit6) are "01 (in binary)" or "1x (in binary; where x is 0 or 1)", it means that information is transmitted from the PC 2 to the multi function device 1.

In addition, when the upper two bits (bit7 and bit6) are "01(in binary)", each of the lower six bits (bit5 to bit0) is configured to have the following meaning.

bit5 to bit3: constantly 0 (reserved for vendor specification)
bit2: 0=no handle close instruction
　　1=all-handle close instruction
bit1: 0=no mode change instruction
　　1=mode change instruction
bit0: (valid only when bit1=1)
　　0=USB storage mode
　　1=FTP server mode That is, when the allocation length is "01000100 (in binary)/0x44 (in hexadecimal)", if the "VPD-Inquiry Page Code 0xc8" is issued, an "all-handle close instruction" is directed to the multi function device 1.

When the allocation length is "01000010 (in binary)/0x42 (in hexadecimal)", if the "VPD-Inquiry Page Code 0xc8" is issued, a "mode change instruction to USB storage mode (hereinafter, this instruction also referred to as "modeset")" is directed to the multi function device 1.

When the allocation length is "01000011 (in binary)/0x43 (in hexadecimal)", if the "VPD-Inquiry Page Code 0xc8", a "mode change instruction to FTP server mode" is directed to the multi function device 1.

Moreover, when the upper two bits (bit7 and bit6) are "1x (in binary)", the lower six bits (bit5 to bit0) may be arbitrarily configured to have the meanings. However, in the embodiment, since these bits are not particularly used, they are constantly set to 0 (reserved for vendor specification).

When the upper two bits (bit7 and bit6) are "00 (in binary)", the lower six bits (bit5 to bit0) have no specific meanings. In this case, for the sake of acquiring the 63-byte VPD information without missing, the lower six bits are all set to "1" in order to assign the allocation length to 63.

If the above allocation length is set and the "VPD-Inquiry Page Code 0xc8" is issued, the PC 2 can acquire the 63-byte VPD information from the multi function device 1.

The VPD information includes a header part and an actual data part defined in the SCSI standard. In the actual data part, three kinds of information (each being 1-byte information; 3 bytes in total) are stored as follows.

<1. Current Mode>
0x00: USB storage mode
0x01: FTP server mode
<2. Presence/Absence of Mode Change Instruction and Result>
0x00: no instruction
0x02: instruction/failure
0x03: instruction/success
<3. Presence/Absence of All-handle close Instruction and Result>
0x00: no instruction
0x02: instruction/failure
0x03: instruction/success That is, as the VPD information, the current mode is constantly returned, but when any instruction is made by the bits of the "Allocation Length" region, the result corresponding to the instruction is returned.

With this structure, for example, if the "VPD-Inquiry Page Code 0xc8" is issued with the allocation length "00111111 (in binary)/0x3f (in hexadecimal)" assigned, the current mode can be acquired as the VPD information.

If the "VPD-Inquiry Page Code 0xc8" is issued with the allocation length "01000100 (in binary)/0x44 (in hexadecimal)" assigned, the current mode and the result of the all-handle close instruction can be acquired as the VPD information.

If the "VPD-Inquiry Page Code 0xc8" is issued with the allocation length "01000010 (in binary)/0x42 (in hexadecimal)" assigned, the current mode and the result of the mode change instruction to the USB storage mode can be acquired as the VPD information.

In addition, if the "VPD-Inquiry Page Code 0xc8" is issued with the allocation length "01000011 (in binary)/0x43 (in hexadecimal)" assigned, the current mode and the result of the mode change instruction to the FTP server mode can be acquired as the VPD information.

(Processing in SCSI Command Analysis Task)

Next, among the processing to be executed in the sections of the multi function device 1, a processing to be executed in the SCSI command analysis task 141 of the multi function device 1 will be described with reference to FIG. 4.

If this processing starts, the multi function device 1 first determines whether or not a SCSI command is input from the PC 2 (S105). If no SCSI command is input from the PC 2 (S105: Not Input), the process returns to S105.

If a SCSI command is input from the PC 2 (S105: Input), it is determined whether or not the SCSI command is the "VPD-Inquiry Page Code 0xc8" (S110). When the SCSI command is not the "VPD-Inquiry Page Code 0xc8" (S110: No), subsequently, the multi function device 1 determines whether or not a current mode is the FTP server mode (S115).

When the current mode is the FTP server mode (S115: Yes), the multi function device 1 determines the SCSI command (S120). When it is determined in S110 that the SCSI command is one of the "Write Buffer" or "Read Buffer" (S120: Write Buffer or Read Buffer), the multi function device 1 transmits the SCSI command to the file unit input/output task 161 and waits for until the file unit input/output task 161 completes a processing (S125). A section for executing S120 serves as an example of a file access request determination section.

In S125, the SCSI command which is transmitted from the PC 2 is transmitted from the SCSI command analysis task 141 to the file unit input/output task 161. In S125, after the SCSI command is transmitted to the file unit input/output task 161, the multi function device 1 waits for until the file unit input/output task 161 completes the processing.

When the file unit input/output task 161 completes the processing, a response is returned from the file unit input/output task 161. Accordingly, in S125, the response from the file unit input/output task 161 is transmitted to the PC 2, and then S125 is ended. If S125 is ended, the process returns to S105.

When it is determined in S120 that the SCSI command is not one of the "Write Buffer" and the "Read Buffer" (S120: other than Write Buffer and Read Buffer), the process proceeds to S130. In addition, when it is determined in S115 that the current mode is the FTP server mode (S115: No), the process also proceeds to S130.

When the process proceeds to S130, the multi function device 1 transmits the SCSI command to the physical sector unit input/output task 143 and waits for until the physical sector unit input/output task 143 completes a processing (S130).

In S130, the SCSI command which is transmitted from the PC 2 is transmitted from the SCSI command analysis task 141 to the physical sector unit input/output task 143. In S130, after the SCSI command is transmitted to the physical sector unit input/output task 143, the multi function device 1 waits for until the physical sector unit input/output task 143 completes a processing.

When the physical sector unit input/output task 143 completes the processing, a response is returned from the physical sector unit input/output task 143. Accordingly, in S130, the response from the physical sector unit input/output task 143 is transmitted to the PC 2, and then S130 is ended. After S130 is ended, the process returns to S105.

A detailed description will now be given for S130 by way of a specific example. For example, there is a case in which a SCSI command requesting to write data to a medium (in this embodiment, a memory card) is transmitted from the PC 2. In this case, in S130, a SCSI command received by the SCSI command analysis task 141 is transmitted to the physical sector unit input/output task 143.

At this time, the physical sector unit input/output task 143 executes a predetermined processing (the details will be described below). Thereafter, information about the execution result of the predetermined processing is returned from the physical sector unit input/output task 143 to the SCSI command analysis task 141 as a response.

In S130, the SCSI command analysis task 141 waits for until the physical sector unit input/output task 143 completes the processing. Thereafter, when receiving the response from the physical sector unit input/output task 143, the SCSI command analysis task 141 returns the response to the PC 2 as a response to the SCSI command, and then S130 is ended.

There is also a case in which a SCSI command requesting to read data from the medium is transmitted from the PC 2. In this case, in S130, a SCSI command received by the SCSI command analysis task 141 is also transmitted to the physical sector unit input/output task 143.

At this time, the physical sector unit input/output task 143 executes a predetermined processing (the details will be described below). Thereafter, information about the execution result of the predetermined processing or read data is returned from the physical sector unit input/output task 143 to the SCSI command analysis task 141 as a response.

In S130, the SCSI command analysis task 141 waits for until the physical sector unit input/output task 143 completes the processing. Thereafter, when receiving the response from the physical sector unit input/output task 143, the SCSI command analysis task 141 returns the response to the PC 2 as a response to the SCSI command, and then S130 is ended.

Although various other SCSI commands exist, in S130, any SCSI command is transmitted from the SCSI command analysis task 141 to the physical sector unit input/output task 143. Thereafter, the response which is returned from the physical sector unit input/output task 143 to the SCSI command analysis task 141 is transmitted to the PC 2.

As described above, since there are various SCSI commands are transmitted from the PC 2 to the physical sector unit input/output task 143, the contents of the processing to be executed by the physical sector unit input/output task 143 vary according to the SCSI commands.

The foregoing description is for a processing when the condition in S110 is false. Meanwhile, when the condition in S110 is true, that is, when the SCSI command is the "VPD-Inquiry Page Code 0xc8" (S110: Yes), the process proceeds to S135.

When the process proceeds to S135, the multi function device 1 determines whether or not the numeral nn in the "Allocation Length" region in the data string constituting the "Inquiry" command is equal to or less than 0x3f (nn≦0x3f) (S135).

If nn≦0x3f, it means that there is no information from the PC 2 (S135: Yes). In this case, therefore, VPD information (VPD-Inquiry DATA) corresponding to the page code 0xc8 is returned to the PC 2 (S140), and the process returns to S105. At this time, as the VPD information, only information about the current mode is returned.

If nn>0x3f it means that there is information from the PC 2 (S135: No). In this case, therefore, on the basis of bit 1 of the numeral nn in the "Allocation Length" region, it is determined whether or not a mode change instruction is present (S145). In S145, if bit1 of the numeral nn in the "Allocation Length" region is "0", it is determined that the mode change instruction is absent, and if bit1 is "1", it is determined that the mode change instruction is present. A section for executing S145 serves as an example of a mode switching request determination section.

When the mode change instruction is present (S145: Presence), the physical sector unit input/output task 143 is requested to execute a mode change (S150). In S150, if bit0 of the numeral nn in the "Allocation Length" region is "0", a mode change to the USB storage mode is requested. In addition, if bit0 of the numeral nn in the "Allocation Length" region is "1", a mode change to the FTP server mode is requested.

If S150 is ended, the process proceeds to S155. Meanwhile, in S145, when the mode change instruction is absent (S145: Absence), S150 is skipped, and the process proceeds to S155.

In this way, if the process proceeds to S155, the multi function device 1 determines whether or not an all-handle close instruction is present (S155). In S155, if bit2 of the numeral nn in the "Allocation Length" region is "0", it is determined that the handle close instruction is absent, and if bit2 is "1", it is determined that the all-handle close instruction is present.

When the all-handle close instruction is present (S155: Presence), the file unit input/output task 161 is instructed to close all handles (S160), and the process proceeds to S140. Meanwhile, in S155, when the all-handle close instruction is absent (S155: Absence), S160 is skipped, and then the process proceeds to S140.

In this way, when the process proceeds to S140, if S150 is executed, as the VPD information, information about presence/absence of the mode change instruction and the result is returned, in addition to the information about the current mode. If S160 is executed, as the VPD information, information about presence/absence of the all-handle close instruction and the result is returned, in addition to the information about the current mode. After S140 is ended, the process returns to S105.

(Processing in Physical Sector Unit Input/Output Task)

Next, a processing to be executed in the physical sector unit input/output task 143 of the multi function device 1 will be described on the basis of FIGS. 5 and 6.

If this processing starts, the multi function device 1 first determines whether or not a SCSI command is input from the SCSI command analysis task 141 (S205). If a SCSI command is input from the SCSI command analysis task 141 (S205: Input), it is determined whether or not the SCSI command is a command which requires an access to a medium (S210).

When the SCSI command is the command which requires to access the medium (S210: Yes), it is determined whether or not the right of use of the memory slot control task 145 is currently being acquired (S215). The right of use of the memory slot control task 145 is the right that the physical sector unit input/output task 143 and the file system task 163 can exclusively acquire. Only when acquiring the right of use, the physical sector unit input/output task 143 and the file system task 163 can access the memory slot control task 145. Accordingly, it is configured such that both can simultaneously perform data transmission with respect to the memory slot control task 145.

In S215, when it is determined that the right of use of the memory slot control task 145 is not being acquired (S215: No), subsequently, it is determined whether or not the current mode is the USB mode (S220). A section for executing S220 serves as an example of a mode determination section.

In S220, when the current mode is the USB mode (S220: Yes), the right of use of the memory slot control task 145 is acquired (S225). The right of use of the memory slot control task 145 may be successfully acquired or not depending on the conditions. Therefore, if S225 is ended, it is determined whether or not the right of use of the memory slot control task 145 is successfully acquired (S230).

When the right of use is not successfully acquired (S230: No), it is considered that the right of use of the memory slot control task 145 is acquired by the file system task 163. In this case, therefore, as a processing corresponding to the SCSI command transmitted from the SCSI command analysis task 141, a processing to return only a pseudo response corresponding to a case in which no medium is mounted is executed (S235), and then the process returns to S205. A section for executing S235 serves as an example of a pseudo response section.

In S220, when the current mode is not the USB mode (S220: No), an access to the USB storage device is prohibited. In this case, therefore, the process proceeds to S235 while skipping S225 and S230.

In this case, as a processing corresponding to the SCSI command transmitted from the SCSI command analysis task 141, a processing to return only a pseudo response corresponding to a case in which no medium is mounted is executed (S235), and then the process returns to S205.

Figure 7:
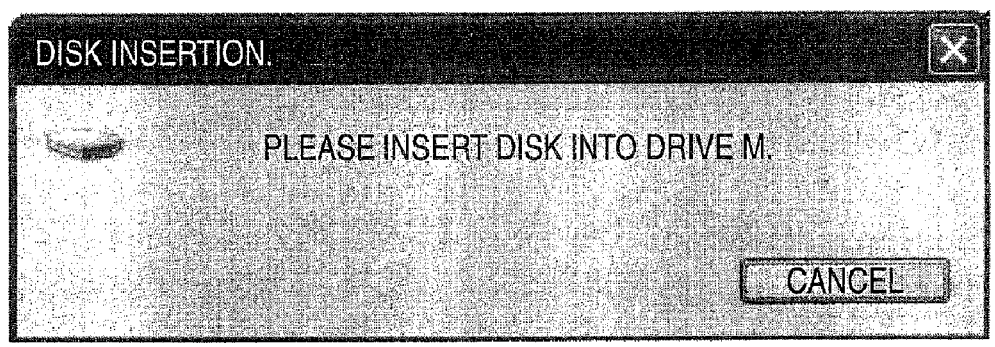
FIG. 7 is an explanatory view of a dialog to be displayed on the PC when no medium is mounted.

If the response corresponding to a case in which no medium is mounted is returned to the PC 2, the PC 2 displays a dialog as shown in FIG. 7. Therefore, the user can understand that an access to the USB storage device is impossible.

Meanwhile, in S230, when the right of use of the memory slot control task 145 is successfully acquired (S230: Yes), the process proceeds to S240. In S215, when it is determined that the right of use of the memory slot control task 145 is currently being acquired (S215: Yes), the process also proceeds to S240.

When the process proceeds to S240, a timer until the right is released is cleared (S240), and the SCSI command is executed (S245). In S245, a processing corresponding to the SCSI command transmitted from the SCSI command analysis task 141 is executed.

Specifically, for example, if the SCSI command is a command requesting to read data from the medium, in S245, an instruction command to read data from the medium is transmitted from the physical sector unit input/output task 143 to the memory slot control task 145.

When receiving the instruction, the memory slot control task 145 reads data in physical sector unit from the medium mounted to one of the first memory slot 151, the second memory slot 152, the third memory slot 153, and the fourth memory slot 154.

Data is then returned from the memory slot control task 145 to the physical sector unit input/output task 143. Then, the physical sector unit input/output task 143 returns data, which is transmitted from the memory slot control task 145, to the SCSI command analysis task 141.

When the SCSI command is a command requesting to write data to the medium, in S245, an instruction to write data to the medium is transmitted from the physical sector unit input/output task 143 to the memory slot control task 145.

When receiving the instruction, the memory slot control task 145 writes data in physical sector unit to the medium mounted to one of the first memory slot 151, the second memory slot 152, the third memory slot 153, and the fourth memory slot 154.

Data about the writing result is returned from the memory slot control task 145 to the physical sector unit input/output task 143. Then, the physical sector unit input/output task 143 returns data, which is transmitted from the memory slot control task 145, to the SCSI command analysis task 141.

Figure 6:
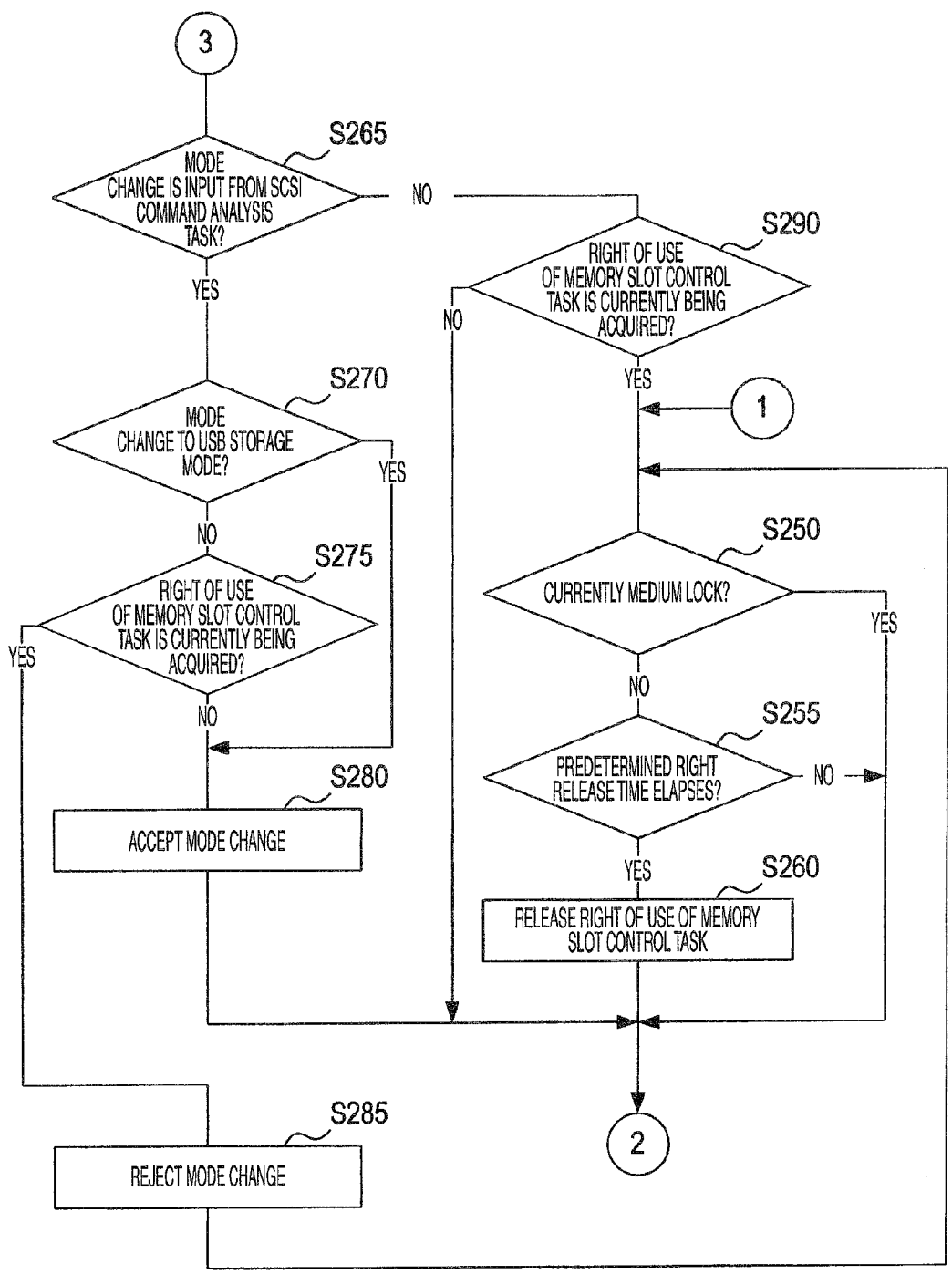
FIG. 6 is a flowchart of a second processing to be executed in the physical sector unit input/output task.

In this way, if S245 is ended, subsequently, as shown in FIG. 6, it is determined whether or not it is currently in a medium lock state (S250). When it is not in the medium lock state (S250: No), it is determined whether or not a predetermined right release time elapses (S255). Then, if the predetermined right release time elapses (S255: Elapsed), the right of use of the memory slot control task 145 is released (S260).

In S250 to S260, the medium lock is set on the basis of an instruction from the PC 2. Therefore, when it is in the medium lock, the PC 2 may execute a processing on an assumption that the medium is not removed.

The predetermined right release time is set to maintain the right of use of the memory slot control task 145 until a predetermined time elapses after the last access request is input from the PC 2. This is set because, even if the medium lock is released, an access request to the medium may be input from the PC 2 due to delayed write control in the PC 2.

Therefore, in S250 to S260, only when the medium lock is released and the predetermined right release time elapses, the right of use of the memory slot control task 145 is released.

Meanwhile, when it is currently in the medium lock state (S250: Yes), or when the predetermined right release time does not elapse (S255: Not Elapsed), S260 is skipped, and the right of use of the memory slot control task 145 is maintained.

Figure 5:
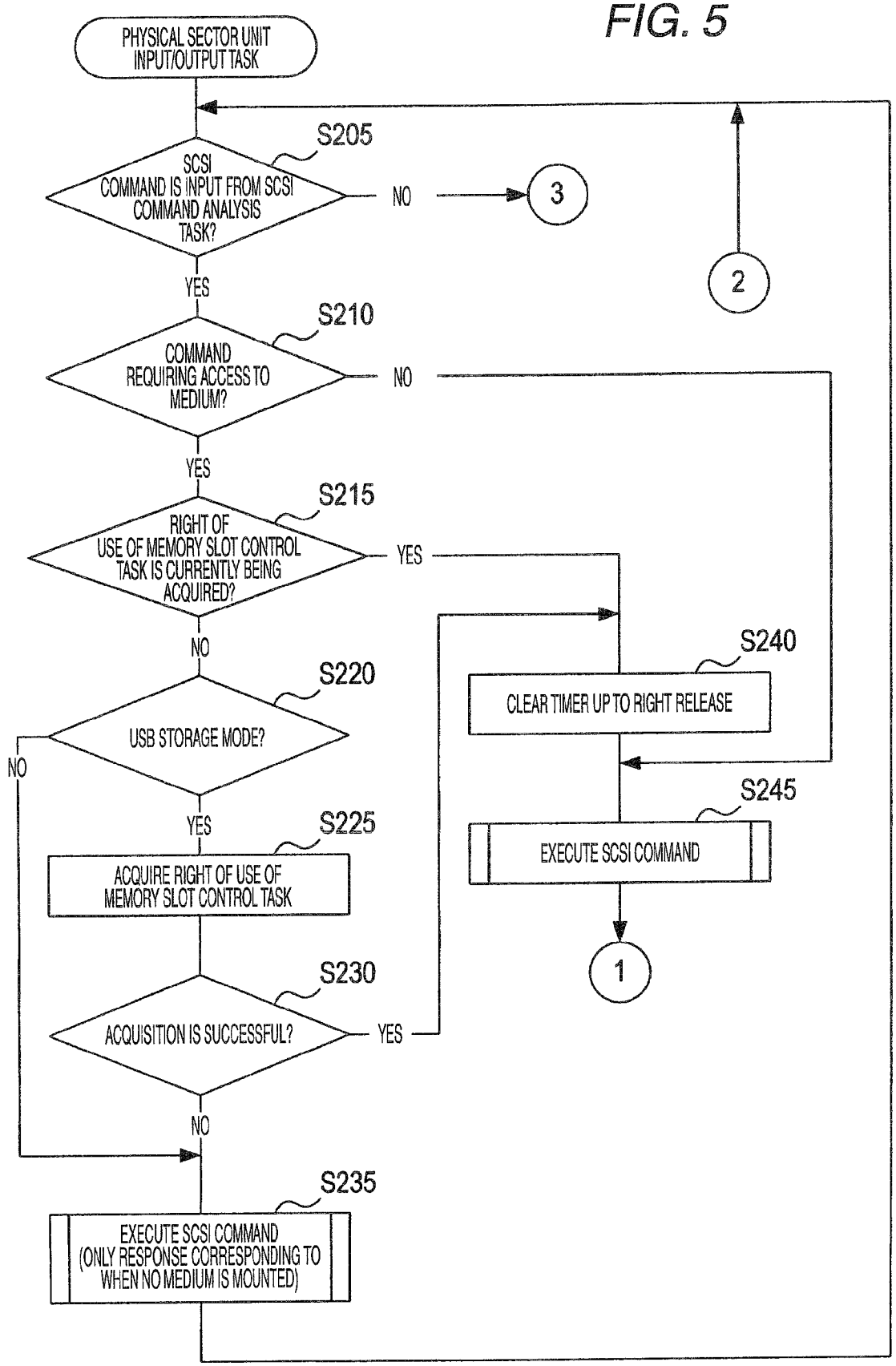
FIG. 5 is a flowchart of a first processing to be executed in a physical sector unit input/output task.

If S250 to S260 are ended, the process returns to S205 (see FIG. 5).

The foregoing description is for a processing when it is determined in S205 that the SCSI command is input. Meanwhile, in S205, it may be determined that no SCSI command is input from the SCSI command analysis task 141 (S205: Not Input).

In this case, the process proceeds to S265 shown in FIG. 6, and it is determined whether or not a mode change request is input from the SCSI command analysis task 141 (S265). The mode change request is issued in S150, which is executed by the SCSI command analysis task 141.

In S265, when it is determined that the mode change request is input (S265: Input), it is determined to whether or not the mode change to the USB mode is requested (S270). In S270, when the mode change to the USB mode is not requested (S270: No), it means that the mode change to the FTP mode is requested.

Then, the physical sector unit input/output task 143 determines whether or not the right of use of the memory slot control task 145 is currently being acquired (S275).

In S275, when the right of use of the memory slot control task 145 is not being acquired (S275: No), the mode change to the FTP mode is possible. In addition, in S270, when the mode change to the USB mode is requested (S270: Yes), the mode change to the USB mode is possible.

In these cases, the mode change is accepted (S280), and the process returns to S205 (see FIG. 5). Accordingly, the mode change to the FTP mode or the USB mode is executed.

Meanwhile, in S275, when the right of use of the memory slot control task 145 is being acquired (S275: Yes), an access from the PC 2 may be continuously received, and thus the mode change to the FTP mode is impossible.

In this case, the mode change is rejected (S285). If S285 is ended, the process proceeds to S250. S250 and later have already been described, and the description will be omitted here.

(Processing in File Unit Input/Output Task)

Next, a processing to be executed in the file unit input/output task 161 of the multi function device 1 will be described with reference to FIGS. 8 and 9.

If this processing starts, the multi function device 1 first determines whether or not a SCSI command is input from the SCSI command analysis task 141 (S305). When no SCSI command is input from the SCSI command analysis task 141 (S305: Not Input), the process returns to S305.

If a SCSI command is input from the SCSI command analysis task 141 (S305: Input), it is determined whether or not the SCSI command is the "Write Buffer/Buffer ID=0x80" (S310). When the SCSI command is not the "Write Buffer/Buffer ID=0x80" (S310: No), the process returns to S305.

When the SCSI command is the "Write Buffer/Buffer ID=0x80" (S310: Yes), a group of character strings of a command which is transmitted from the SCSI command analysis task 141 is received (S315). Then, on the basis of the first character string among the group of character strings, it is determined whether or not the SCSI command is a file access command in which the file access data output is continuously input (S320).

When it is determined in S320 that the SCSI command is a command in which the file access data output exists (S320: Yes), it waits for until the "Write Buffer/Buffer ID=0x81" is input (S325: Wait). Then, if the "Write Buffer/Buffer ID=0x81" is input (S325: Input), data is received (S330), and the process proceeds to S335.

In S320, when it is determined that the SCSI command is not a command in which the file access data output exists (S320: No), S325 and S330 are skipped, and the process proceeds to S335.

In this way, when the process proceeds to S335, the command of the first character string among the group of character strings is executed (S335). S335 will be shown in FIG. 9 in detail.

That is, the multi function device 1 first determines the first character string (S405).

In S405, when the first character string is fopen or fclose (S405: fopen/fclose), a function fopen( ) or fclose( ) is called (S410). Accordingly, the file unit input/output task 161 can open or close a file through the file system task 163.

In S405, when the first character string is fread or fwrite (S405: fread/fwrite), a function fread( ) or fwrite( ) is called (S415). Accordingly, the file unit input/output task 161 can read and write a file through the file system task 163.

In S405, when the first character string is fseek (S405: fseek), a function fseek( ) is called (S420). Accordingly, the file unit input/output task 161 can seek a file through the file system task 163.

In S405, when the first character string is flist (S405: flist), a function flist( ) is called (S425). Accordingly, the file unit input/output task 161 can create a file list through the file system task 163.

If one of S410 to S425 is ended, data or status as the processing result is set in a buffer for Read Buffer (S430). Then, it waits for until data set in the buffer is extracted from the PC 2.

Figure 8:
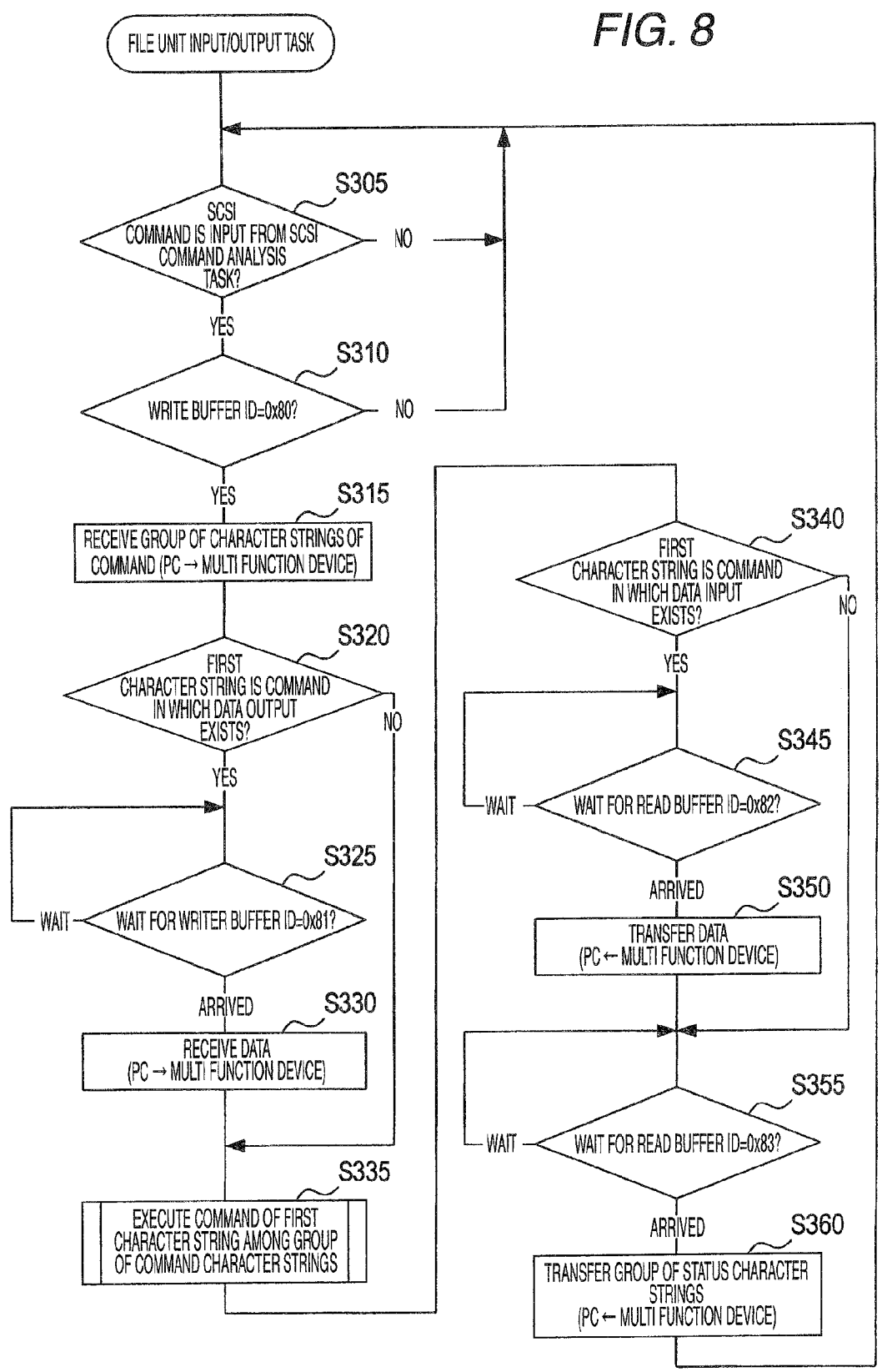
FIG. 8 is a flowchart of a first processing to be executed in a file unit input/output task.
Figure 9:
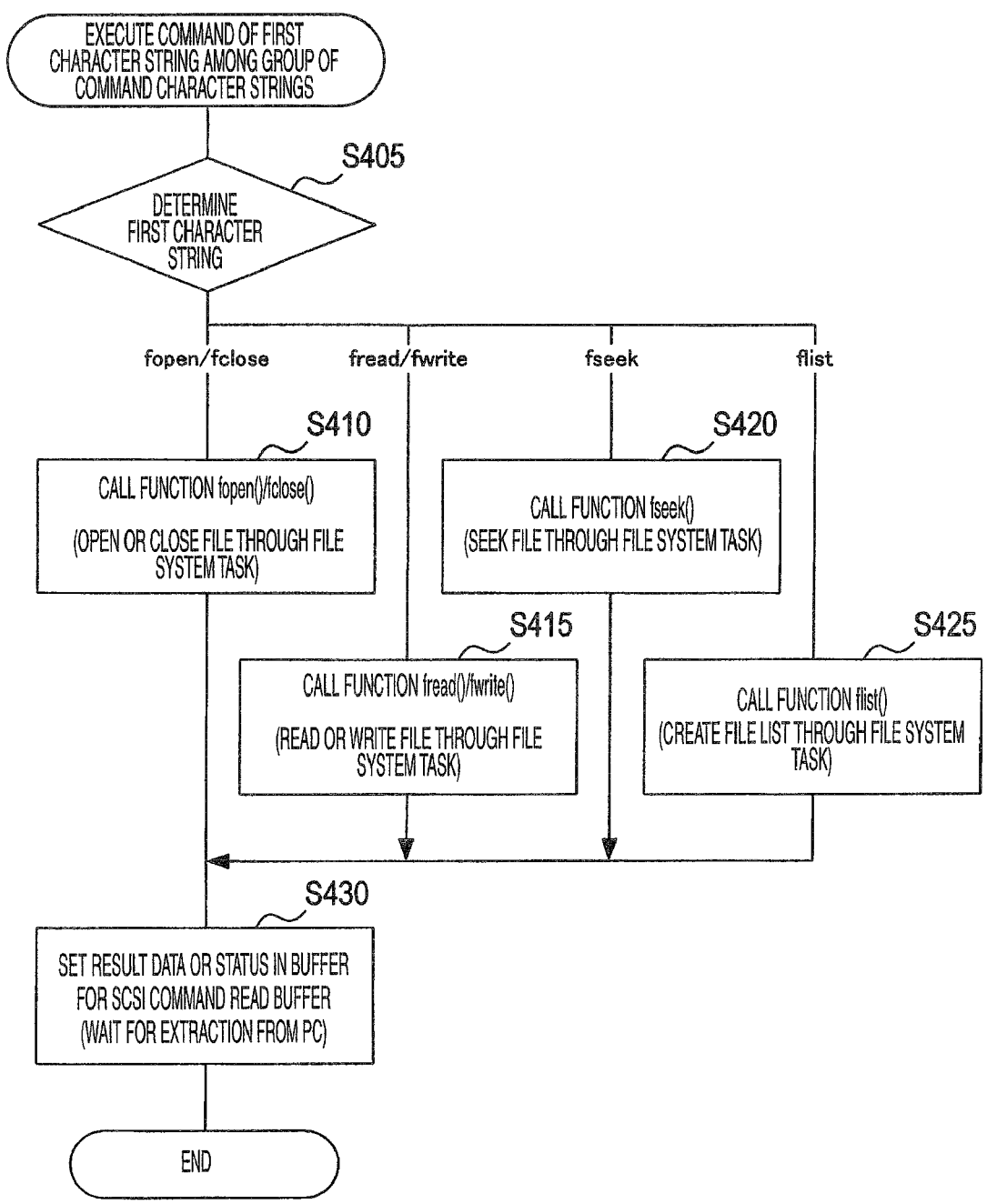
FIG. 9 is a flowchart of a second processing to be executed in the file unit input/output task.

If S405 to S430 are ended, S335 shown in FIG. 8 is ended, and subsequently, on the basis of the first character string, it is determined whether or not the SCSI command is the file access command in which the file access data input exists (S340).

In S340, when it is determined that the SCSI command is the command in which the file access data input exists (S340: Yes), it waits for until the "Read Buffer/Buffer ID=0x82" is input (S345: Wait). Then, if the "Read Buffer/Buffer ID=0x82" is input (S345: Input), data is transmitted from the multi function device 1 to the PC 2 (S350), and the process proceeds to S355.

In S340, when it is determined that the SCSI command is not the command in which the file access data input exists (S340: No), S345 and S350 are skipped, and the process proceeds to S355.

In this way, if the process proceeds to S355, it waits for until the "Read Buffer/Buffer ID=0x83" is input (S355: Wait). Then, if the "Read Buffer/Buffer ID=0x83" is input (S355: Input), a group of status character strings is transferred from the multi function device 1 to the PC 2 (S360), and the process returns to S305.

(Processing in File System Task of Multi Function Device)

Figure 10:
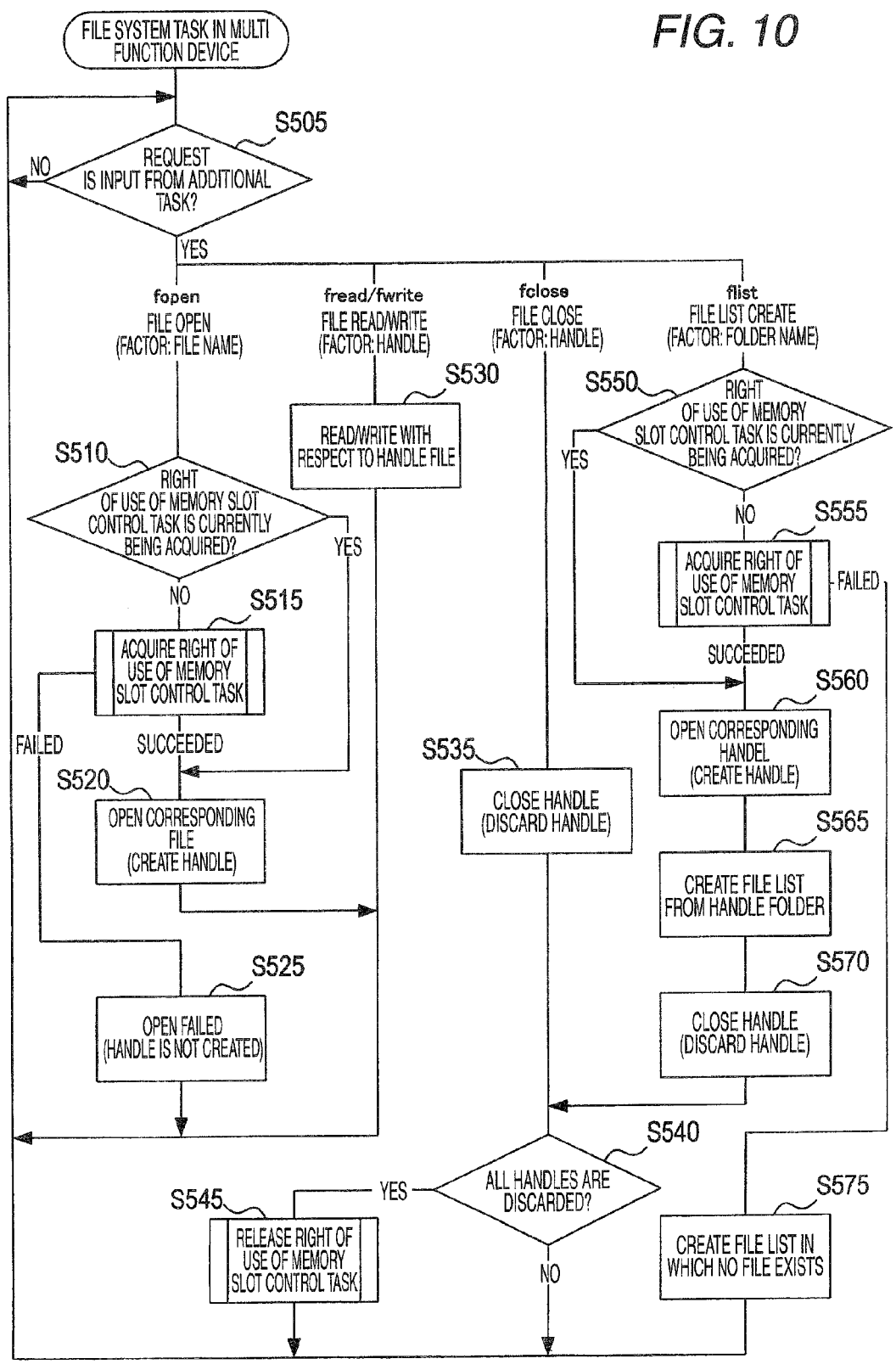
FIG. 10 is a flowchart of a processing to be executed in a file system task of the multi function device.

Next, a processing to be executed in the file system task 163 of the multi function device 1 will be described with reference to FIG. 10.

If this processing starts, the multi function device 1 first determines whether or not a file access related request is input from an additional task (S505). Specific examples of the additional task include, for example, the file unit input/output task 161, the medium print function 171, and the FTP server task 173.

In addition to these additional tasks, a task that issues a request to the file system task 163 may exist according to the functions installed in the multi function device 1.

In S505, when no request is input from the additional task (S505: Not Input), the process returns to S505. When a request is input from the additional task (S505: Yes) and if the request is fopen (S505: fopen), it is determined whether or not the right of use of the memory slot control task 145 is currently being acquired (S510).

As described above, the right of use of the memory slot control task 145 is the right that can be exclusively acquired by the physical sector unit input/output task 143 and the file system task 163.

When it is determined in S510 that the right of use of the memory slot control task 145 is not being acquired (S510: No), the right of use of the memory slot control task 145 is acquired (S515). The right of use of the memory slot control task 145 may be acquired or not depending on the conditions.

When the right of use is successfully acquired (S515: Successful) or when the right of use has already been acquired (S510: Yes), a file open processing is executed (a handle is created) (S520), and the process returns to S505.

When the right of use is not successfully acquired (S515: Failure), it is considered that the right of use of the memory slot control task 145 is acquired by the physical sector unit input/output task 143. Therefore, the file is not successfully opened (S525). In this case, no handle is created, and the process returns to S505.

In S505, when the request from the additional task is fread or fwrite (S505: fread/fwrite), a handle file is read (S530), and the process returns to S505.

In S505, when the request from the additional task is fclose (S505: fclose), a handle close processing is executed (handle is discarded) (S535). Then, it is determined whether or not all handles are discarded (S540).

When it is determined in S540 that all the handles are discarded (S540: Yes), the right of use of the memory slot control task 145 is released (S545), and the process returns to S505. When it is determined that there is an undiscarded handle (S540: No), S545 is skipped, and the process returns to S505.

In S505, when the request from the additional task is flist (S505: flist), it is determined whether or not the right of use of the memory slot control task 145 is currently being acquired (S550).

When it is determined in S550 that the right of use of the memory slot control task 145 is not being acquired (S550: No), the right of use of the memory slot control task 145 is acquired (S555). The right of use of the memory slot control task 145 may be acquired or not depending on the conditions.

When the right of use is successfully acquired (S555: Success) or when the right of use has already been acquired (S550: Yes), a file open processing is executed (a handle is created) (S560).

Then, a file list is created from a handle folder (S565), and a handle close processing is executed (handle is discarded)

(S535). If S570 is ended, the process proceeds to S540. S540 and later have already been described, and the description will be omitted here.

In S555, when the right of use is not successfully acquired (S555: Failure), a file list in which no file exists is created (S575), and the process returns to S505.

(Processing in Medium Print Function of Multi Function Device)

Next, a processing to be executed in the medium print function 171 of the multi function device 1 will be described with reference to FIG. 11.

If this processing starts, the multi function device 1 first creates a file list in a root directory of the card (S605). In S605, by calling a function flist( ), an access to a file on the memory card is executed through the medium print function 171.

Next, on the basis of the file list in the root directory, it is determined whether or not a subdirectory exists. When a subdirectory exists, as for the subdirectory, a file list is created (S610). In S610, by calling the function flist( ), an access to a file on the memory card is executed through the medium print function 171. S610 is executed on all the subdirectories.

Next, an image file is extracted from the file list obtained in S605 and S610 (S615), and it is determined whether or one or more image files are extracted (S620). When no image file exists (S620: Absence), a message, "No image file exists in the card" is displayed on the display section of the multi function device 1 (S625), and the processing shown in FIG. 11 is ended.

When it is determined in S620 that one or more image files exist (S620: Presence), the thumbnails of the image files are created (S630). In S630, the functions fopen( ), fread( ), and fclose( ) are called, and an access to a file on the memory card (read the image file) is executed through the medium print function 171. Then, the read image file is thumbnailed.

Next, an image file in the card is displayed on the display section of the multi function device 1 (S635). In S635, the file name of the image file and the thumbnail created in S630 are displayed in pair on the display section of the multi function device 1.

Thereafter, the multi function device 1 waits for the user input, and at this time, the user can select an image file to be printed (S640). In this state, when the user makes a cancel operation (S640: Cancel), the processing shown in FIG. 11 is ended.

In S640, when the user selects an image file and inputs an instruction to start printing (S640: Selection and Print Start), the multi function device 1 reads the image file to be printed (S645). In S645, the functions fopen( ), fread( ), and fclose( ) are called, and an access to a file on the memory card (read the image file) is executed through the medium print function 171.

Figure 11:
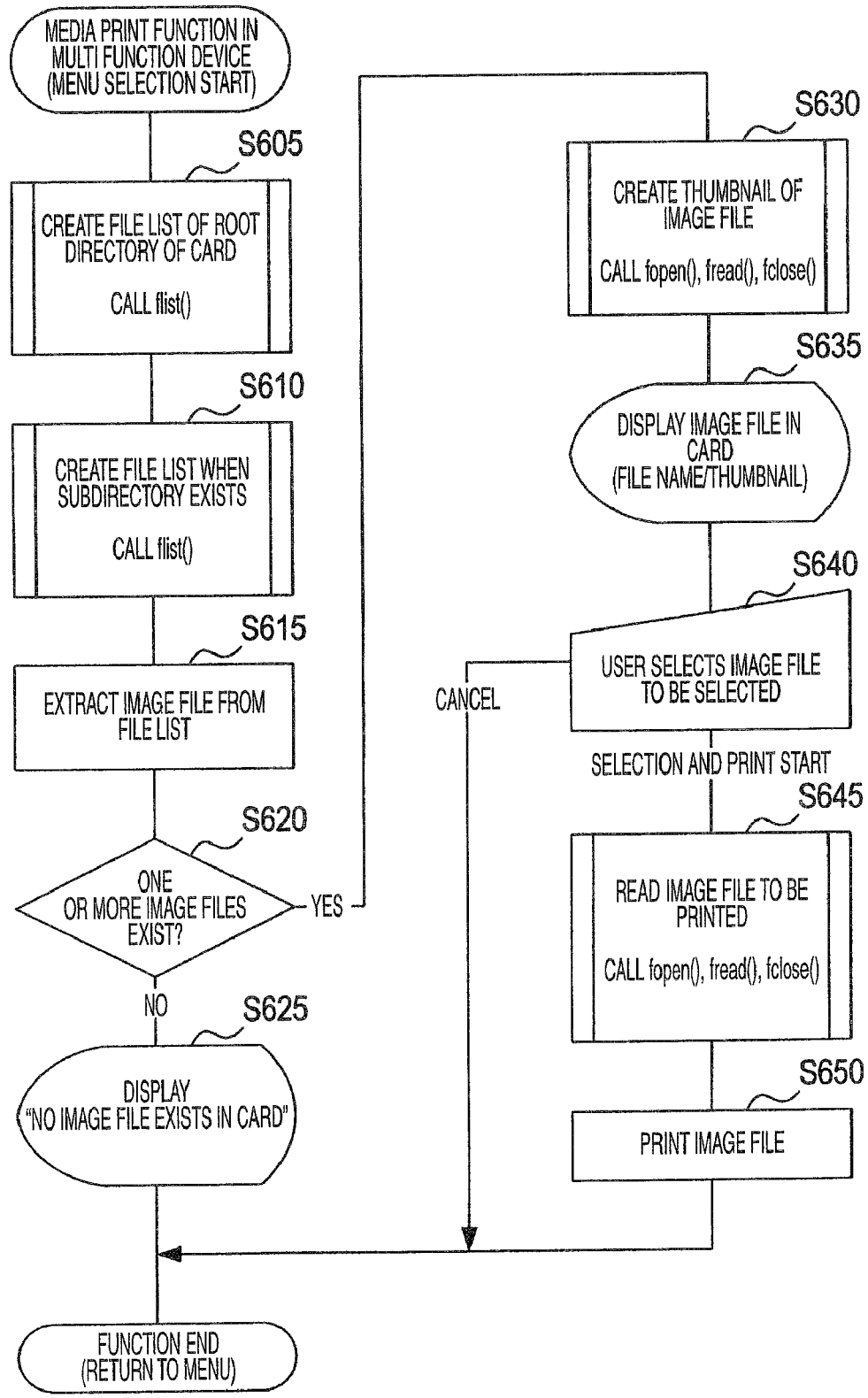
FIG. 11 is a flowchart of a processing to be executed in a medium print function of the multi function device.

Then, the image file read from the card is printed (S650), and the processing shown in FIG. 11 is ended.

(Processing to be Executed when FTP Server Application Serving as PC is Activated)

Next, a processing to be executed when the FTP server application 281 serving as the PC 2 is activated will be described with reference to FIG. 12.

The FTP server application 281 may be activated with any timing, but when the function can be constantly used, it may be set to be activated when the PC 2 is activated.

If the FTP server application 281 is activated and this processing starts, the PC 2 executes modeget (S705). In detail, the "VPD-Inquiry Page Code 0xc8" is issued with the allocation length "00111111 (in binary)/0x3f (in hexadecimal)" assigned, thereby requesting the multi function device 1 to execute the modeget command.

Figure 4:
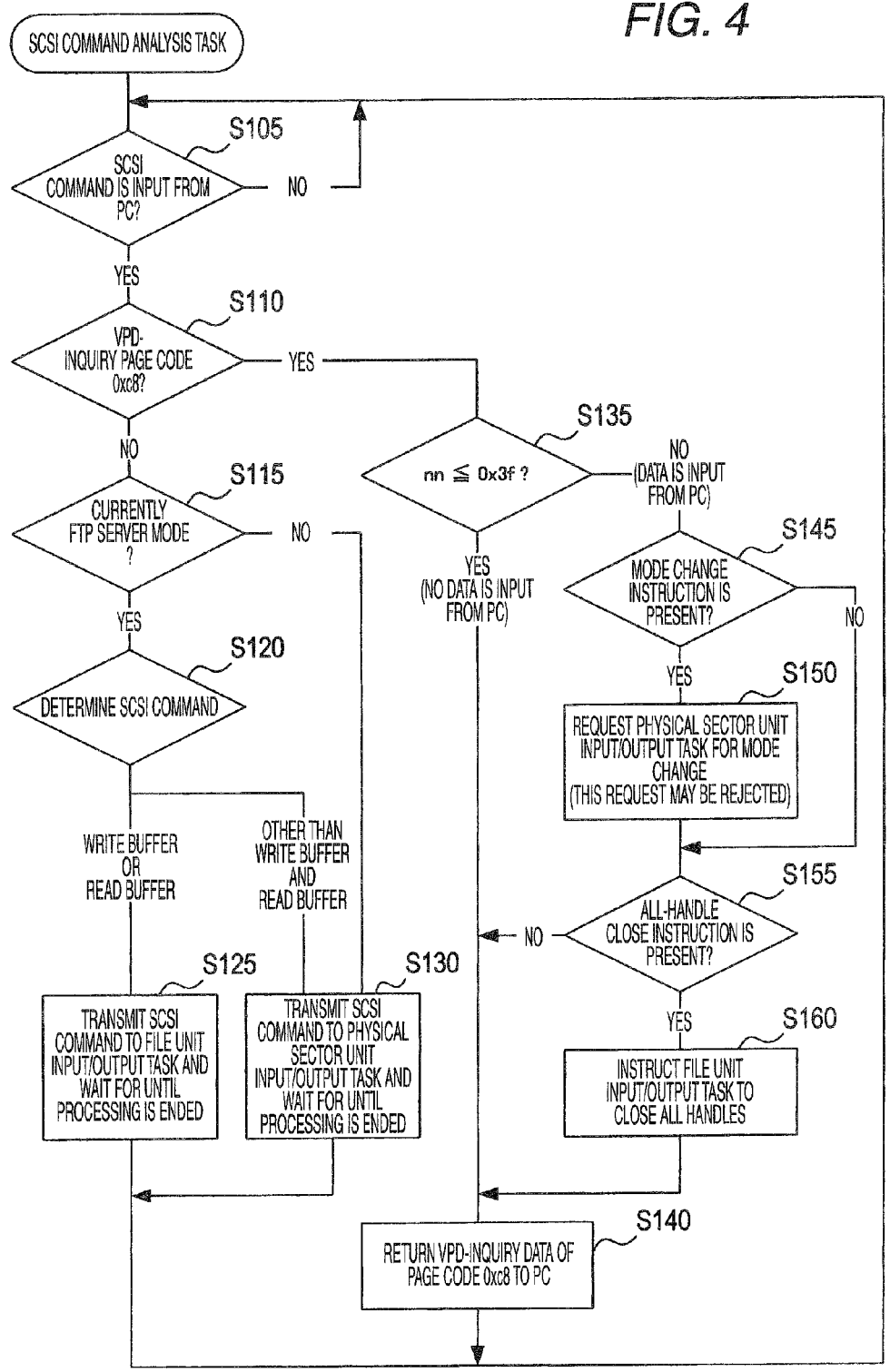
FIG. 4 is a flowchart of a processing to be executed in a SCSI command analysis task.

If the request to execute the modeget command is transmitted to the multi function device 1, in S140 shown in FIG. 4, the SCSI command analysis task 141 returns the VPD information (VPD-Inquiry DATA) corresponding to the page code 0xc8 to the PC 2. Accordingly, the PC 2 acquires the VPD information including information about the current mode.

In this way, if the mode of the multi function device 1 is acquired, the mode is stored (S710), and it is determined whether or not the mode change to the FTP mode is set when the FTP server application is activated (S715). The user may arbitrarily set whether or not the device is switched to the FTP mode when the FTP server application is activated. How the mode change is set is stored in a setup file for the FTP server application.

When the mode change to the FTP mode is set (S715: Yes), it is determined whether or not the current mode of the multi function device 1 (the mode acquired in S705 and stored in S710) is the FTP mode (S720).

When the current mode is not the FTP mode (S720: No), the PC 2 executes modeset (S725). Specifically, the "VPD-Inquiry Page Code 0xc8" is issued with the allocation length "01000011 (in binary)/0x43 (in hexadecimal)" assigned, thereby requesting the multi function device 1 to execute the modeset command.

If the request to execute the modeset command is transmitted to the multi function device 1, in S145 and S150 shown in FIG. 4, the SCSI command analysis task 141 requests the physical sector unit input/output task 143 of the mode change. Then, the physical sector unit input/output task 143 executes S270 to S285.

In S140 shown in FIG. 4, information about whether or not the mode change is successful is returned to the PC 2 as the VPD information corresponding to the page code 0xc8. As a result, the PC 2 acquires the information about whether or not the mode change is successful.

Next, the PC 2 determines whether or not the mode change is successful (S730). When the mode change is successful (S730: Yes), the current mode of the multi function device 1 is stored as the FTP mode (S735), and then the process proceeds to S740.

When it is determined in S715 that the mode change to the FTP mode is not set (S715: No) or when it is determined in S720 that the current mode is the FTP mode (S720: Yes), it is not necessary to perform the mode change. In this case, therefore, S725 to S735 are skipped, and the process proceeds to S740.

In S730, when the mode change is failed (S730: No), a failure in the mode change is displayed for a predetermined time (S737), and then the process proceeds to S740.

If the process proceeds to S740, a task tray icon based on the current mode of the multi function device 1 is determined (S740), an FTP server thread is activated, and a FTP server port of the TCP/IP is opened (S745). Thus, the processing shown in FIG. 12 is ended.

Figure 12:
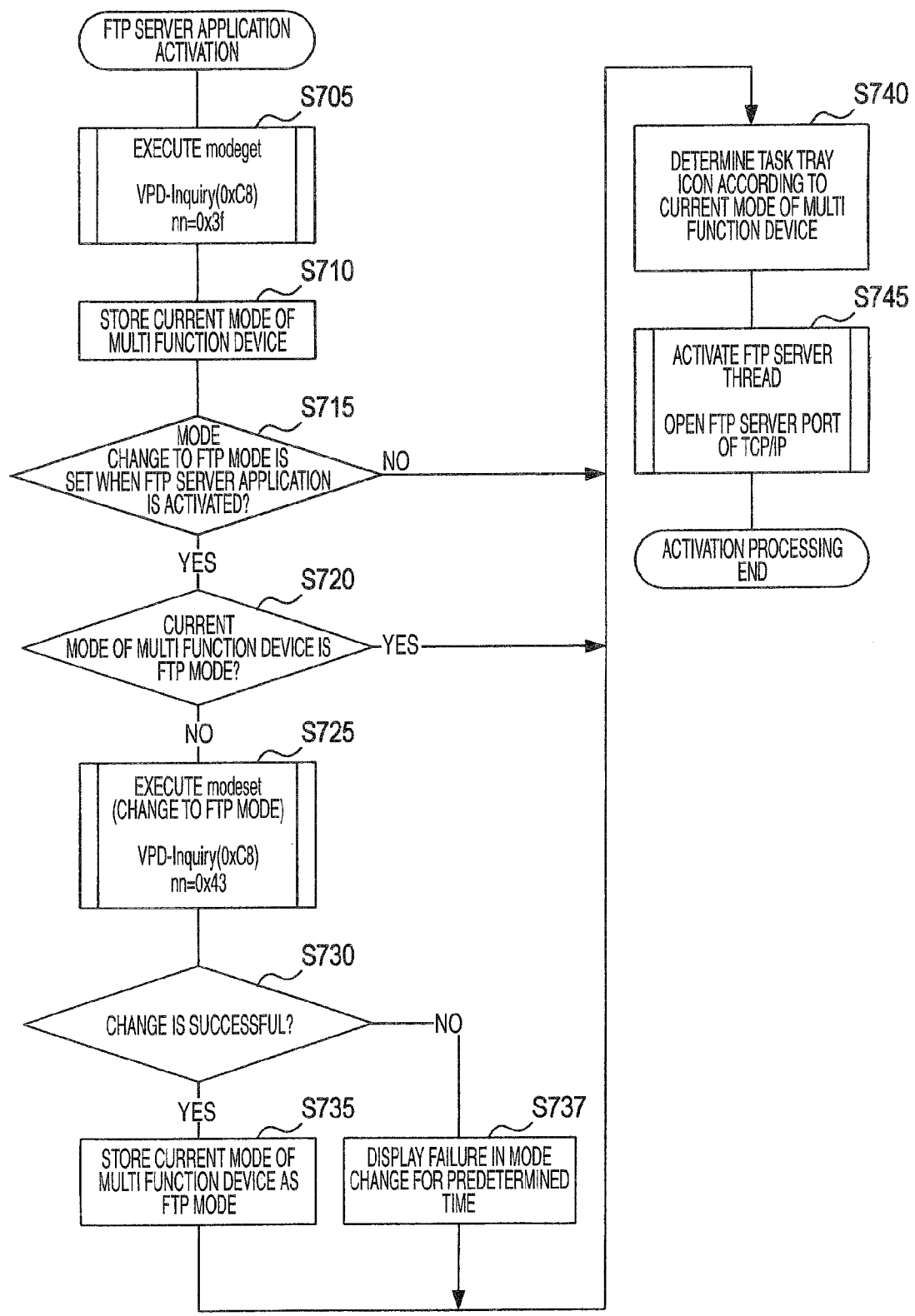
FIG. 12 is a flowchart of a processing to be executed when a FTP server application is activated.
Figure 13A:
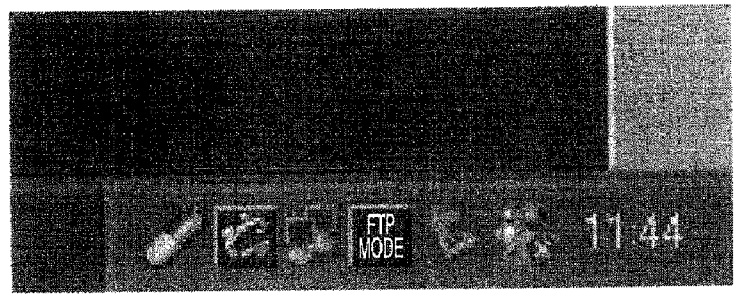
FIGS. 13A to 13C are explanatory views of an icon to be displayed on the PC.
Figure 13B:
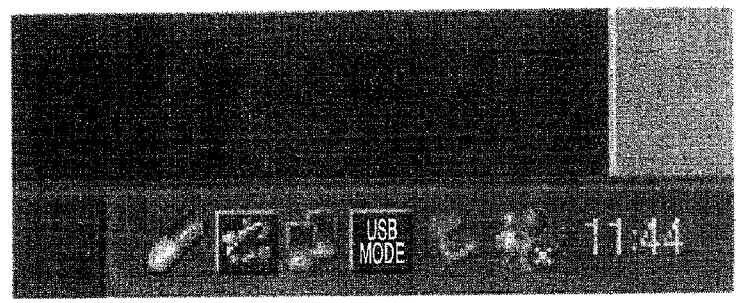

In this way, if the processing shown in FIG. 12 is ended, the current mode of the multi function device 1 is displayed in a task tray (an information notification region based on the standard of Windows (Registered Trademark) serving as the OS) on the display section of the PC 2 as indicated by an icon in FIG. 13A or 13B.

Figure 13C:
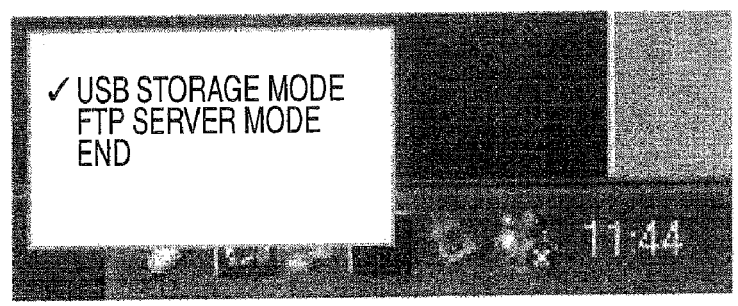

If this icon is clicked by a pointing device, as shown in FIG. 13C, a popup window is displayed. In the popup window, a mode list and an item for instructing to end an application are displayed. Here, by clicking one of these items with the pointing device, the user can instruct the FTP server application 281 to switch the mode or to end the application.

A processing to be executed by the FTP server application 281 when the user instructs the mode change will be described below.

(Switching Processing to FTP Mode by FTP Server Application)

Figure 14:
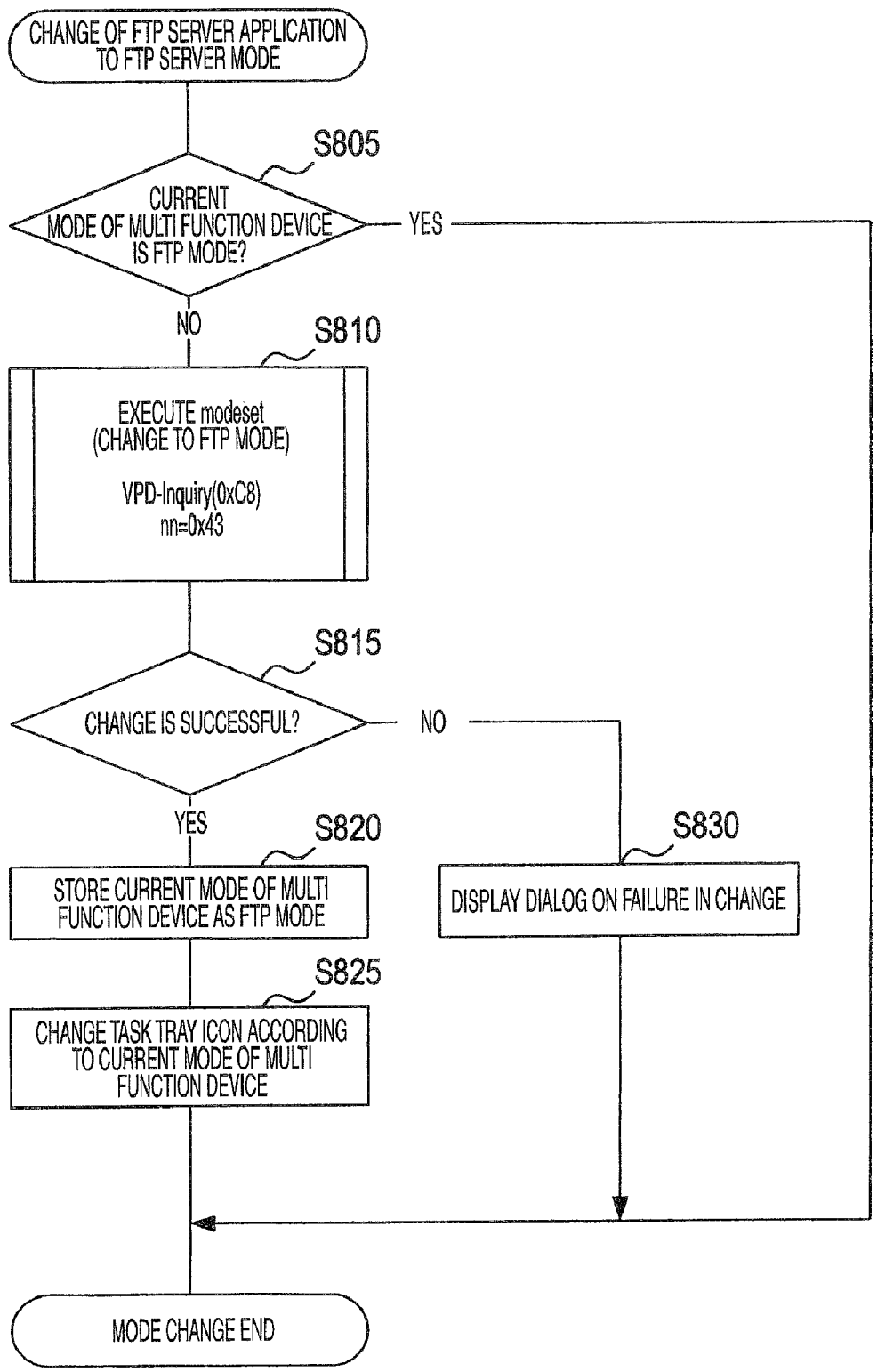
FIG. 14 is a flowchart of a switching processing to an FTP mode by the FTP server application.

Next, a processing to be executed by the FTP server application 281 when the user instructs the FTP server application 281 to switch the multi function device to the FTP mode will be described with reference to FIG. 14.

If this processing starts, the PC 2 first determines whether or not the current mode of the multi function device 1 is the FTP mode (S805). When the current mode is the FTP mode (S805: Yes), it is not necessary to perform the mode change, and thus the processing shown in FIG. 14 is ended.

In S805, when the current mode is not the FTP mode (S805: No), the PC 2 executes modeset (S810). Specifically, the "VPD-Inquiry Page Code 0xc8" is issued with the allocation length "01000011 (in binary)/0x43 (in hexadecimal)" assigned, thereby requesting the multi function device 1 to execute the modeset command. This processing is the same as S725 described above, and a further description thereof will be omitted.

If S810 is ended, the PC 2 determines whether or not the mode change is successful (S815). When the mode change is successful (S815: Yes), the current mode of the multi function device 1 is stored as the FTP mode (S820), and the task tray icon is changed according to the current mode of the multi function device 1 (S825). Thus, the processing shown in FIG. 14 is ended.

When it is determined in S815 that the mode change is failed (S815: No), the PC 2 displays a dialog indicative of a failure in the mode change (S830). Thus, the processing shown in FIG. 14 is ended.

(Switching Processing to USB Mode by FTP Server Application)

Next, a processing to be executed by the FTP server application 281 when the user instructs the FTP server application 281 to switch the multi function device to the USB mode will be described with reference to FIG. 15.

If this processing starts, the PC 2 first determines whether or not the current mode of the multi function device 1 is the USB mode (S905). When the current mode is the USB mode (S905: Yes), it is not necessary to perform the mode change, and thus the processing shown in FIG. 15 is ended.

In S905, when the current mode is not the USB mode (S905: No), it is determined whether or not a file is currently being transferred through the FTP server (S910). When a file is being transferred through the FTP server (S910: Yes), a dialog is displayed (S915).

In this dialog, a message, "A file is currently being transferred through the FTP server. If the multi function device 1 is switched, transfer is interrupted due to an error. Still, you want to switch the mode?". To this message, the user can select one of "Yes" and "No".

When the user selects "No" (S915: No), the processing shown in FIG. 15 is ended. When the user selects "Yes" (S915: Yes), the process proceeds to S920. In addition, when it is determined in S910 that no file is being transferred through the FTP server (S910: No), S915 is skipped, and then the process proceeds to S920.

In this way, if the process proceeds to S920, the PC 2 executes modeset (S920). Specifically, the "VPD-Inquiry Page Code 0xc8" is issued with the allocation length "01000010 (in binary)/0x42 (in hexadecimal)" assigned, thereby requesting the multi function device 1 to execute the modeset command. This processing is the same as S725 or S810 described above, except for the mode change to the USB mode (that is, in the allocation length, bit0=0), and thus a further description thereof will be omitted.

If S920 is ended, the PC 2 determines whether or not the mode change is successful (S925). When the mode change is successful (S925: Yes), the current mode of the multi function device 1 is stored as the USB mode (S930), and a task tray icon is changed according to the current mode of the multi function device 1 (S935).

Figure 15:
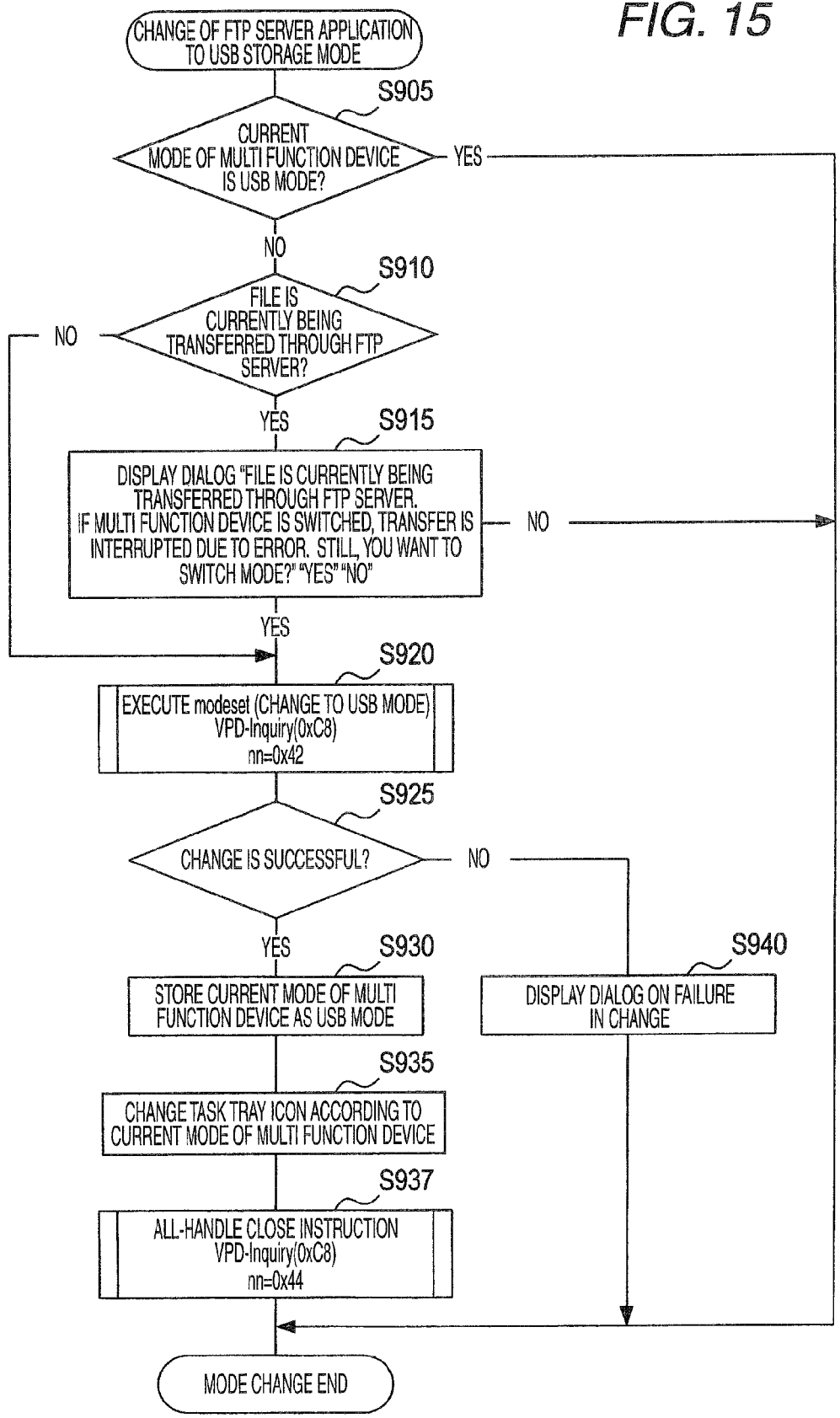
FIG. 15 is a flowchart of a switching processing to a USB mode by the FTP server application.

Next, the multi function device 1 is instructed to close all the handles (S937), and the processing shown in FIG. 15 is ended. In S937, specifically, the "VPD-Inquiry Page Code 0xc8" is issued with the allocation length "01000100 (in binary)/0x44 (in hexadecimal)" assigned, thereby requesting the multi function device 1 to execute the all-handle close instruction.

If this request is transmitted to the multi function device 1, in S155 and S160 shown in FIG. 4, the SCSI command analysis task 141 requests the file unit input/output task 161 to close all the handles. Then, the file unit input/output task 161 executes a processing to close all the opened handles.

Information about whether or not the all-handle close is successful is returned to the PC 2 as the VPD information corresponding to the page code 0xc8 in S140 of FIG. 4. As a result, the PC 2 acquires the information about whether or not the all-handle close is successful.

When it is determined in S925 that the mode change is failed (S925: No), the PC 2 displays a dialog indicative of a failure in the mode change (S940), and then the processing shown in FIG. 15 is ended.

(Function fopen( ) in FTP Server Application)

Figure 16:
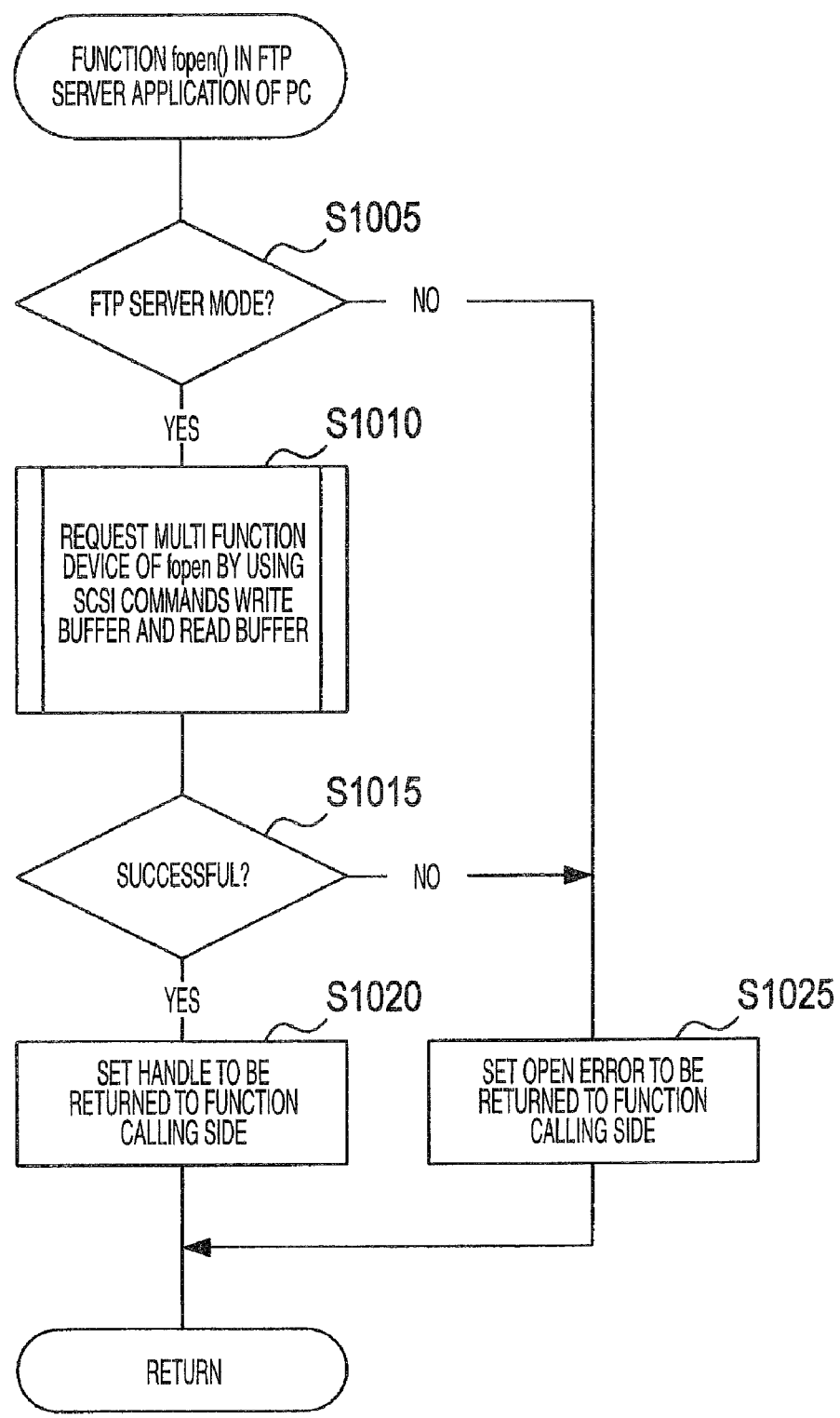
FIG. 16 is a flowchart of a fopen( ) function in the FTP server application.

Next, a processing to be executed by the PC 2 when the function fopen( ) in the FTP server application 281 is called will be described with reference to a flowchart shown in FIG. 16.

In case of a general application running on the PC 2, if the function fopen( ) is called, an instruction related to a file access is transmitted to the file system 231, but in case of the FTP server application 281, the following processing is executed.

That is, when the function fopen( ) in the FTP server application 281 is called, the PC 2 first determines whether or not the multi function device 1 is in the FTP server mode (S1005).

If the multi function device 1 is in the FTP server mode (S1005: Yes), fopen is requested from the multi function device 1 by using the SCSI commands "Write Buffer" and "Read Buffer" (S1010).

Specifically, in S1010, an indication for requesting fopen is transmitted to the multi function device 1 by the "Write Buffer" command. When receiving this command, the multi function device 1 executes a processing corresponding to the function fopen( ) by using the file unit input/output task 161 according to the procedure shown in FIGS. 8 and 9. Then, in S1010, the result of the processing in the multi function device 1 is acquired by the "Read Buffer" command.

If S1010 is ended, the PC 2 determines whether or not the processing in the multi function device 1 is successful (S1015). When the processing is successful (S1015: Yes), a handle is set to be returned to the function calling side (S1020), and then the processing shown in FIG. 16 is ended. A handle which is returned to the function calling side in S1020 corresponds to a handle acquired by the "Read Buffer" command in S1010.

When it is determined in S1015 that the processing in the multi function device 1 is failed (S1015: No) or when it is determined in S1005 that the multi function device 1 is not in the FTP server mode (S1005: No), an open error is set to be returned to the function calling side (S1025), and then the processing shown in FIG. 16 is ended.

With this processing, the PC 2 can open a file in the multi function device 1 through the file system task 163 of the multi function device 1, not through the file system 231.

(Function fclose( ) in FTP Server Application)

Figure 17:
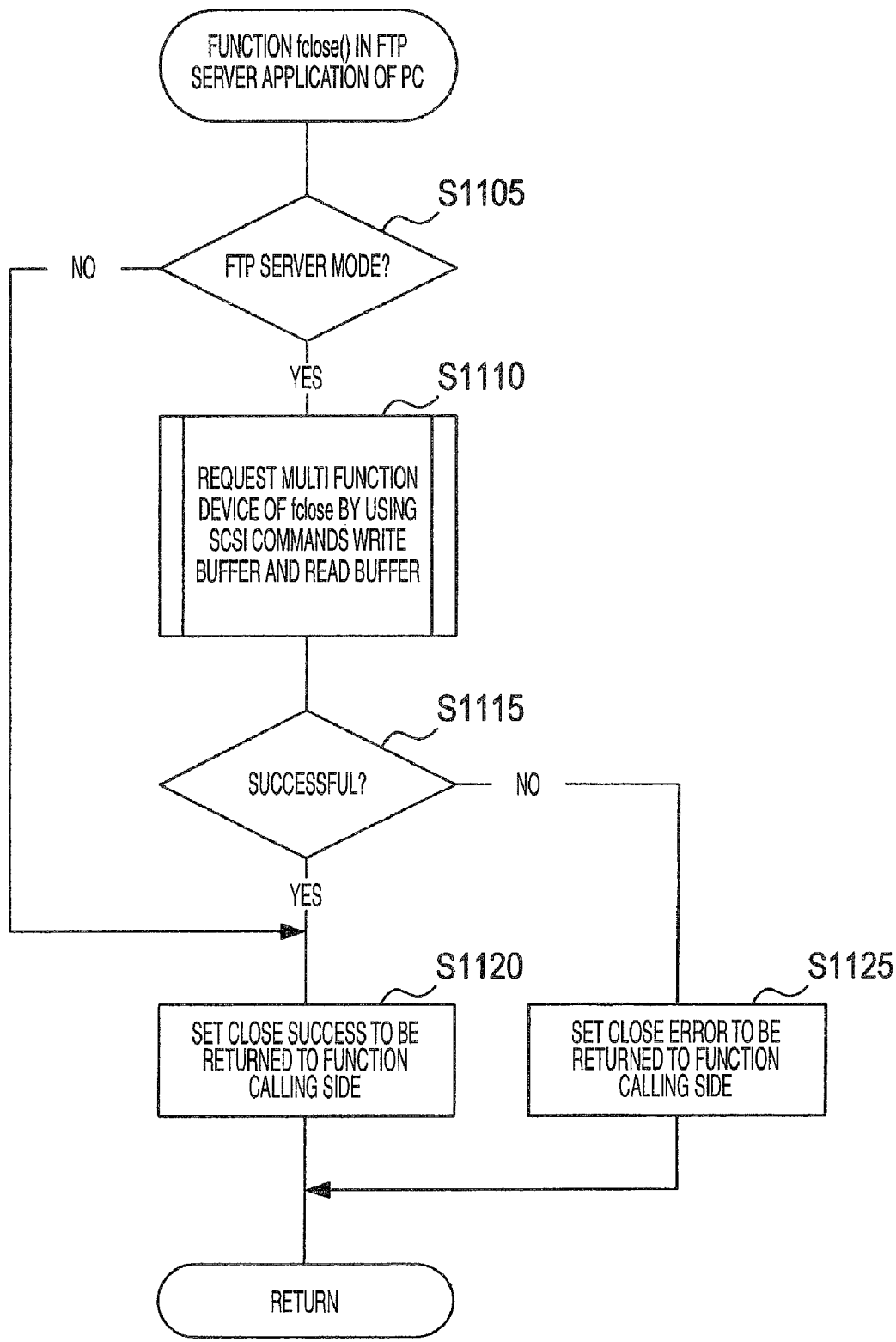
FIG. 17 is a flowchart of a fclose( ) function in the FTP server application.

Next, a processing to be executed by the PC 2 when the function fclose( ) in the FTP server application 281 is called will be described with reference to a flowchart shown in FIG. 17.

When the function fclose( ) in the FTP server application 281 is called, the PC 2 first determines whether or not the multi function device 1 is in the FTP server mode (S1105).

If the multi function device 1 is in the FTP server mode (S1105: Yes), fclose is requested from the multi function device 1 by using the SCSI commands "Write Buffer" and "Read Buffer" (S1110).

Specifically, in S1110, an indication for requesting fclose is transmitted to the multi function device 1 by the "Write Buffer" command. When receiving this command, the multi function device 1 executes a processing corresponding to the function fclose( ) by using the file unit input/output task 161 according to the procedure shown in FIGS. 8 and 9. Then, in S1110, the result of the processing in the multi function device 1 is acquired by the "Read Buffer" command.

If S1110 is ended, the PC 2 determines whether or not the processing in the multi function device 1 is successful (S1115). When the processing is successful (S1115: Yes), a close success is set to be returned to the function calling side (S1120), and then the processing shown in FIG. 17 is ended.

When it is determined in S1115 that the processing in the multi function device 1 is failed (S1115: No), a close error is set to be returned to the function calling side (S1125), and then the processing shown in FIG. 17 is ended. In addition, when it is determined in S1105 that the multi function device 1 is not in the FTP server mode (S1105: Yes), a close success is se to be returned to the function calling side (S1120), and then the processing shown in FIG. 17 is ended.

With this processing, the PC 2 can close a file in the multi function device 1 through the file system task 163 of the multi function device 1, not through the file system 231.

(Function fread( )/fwrite( )/fseek( ) in FTP Server Application)

Figure 18:
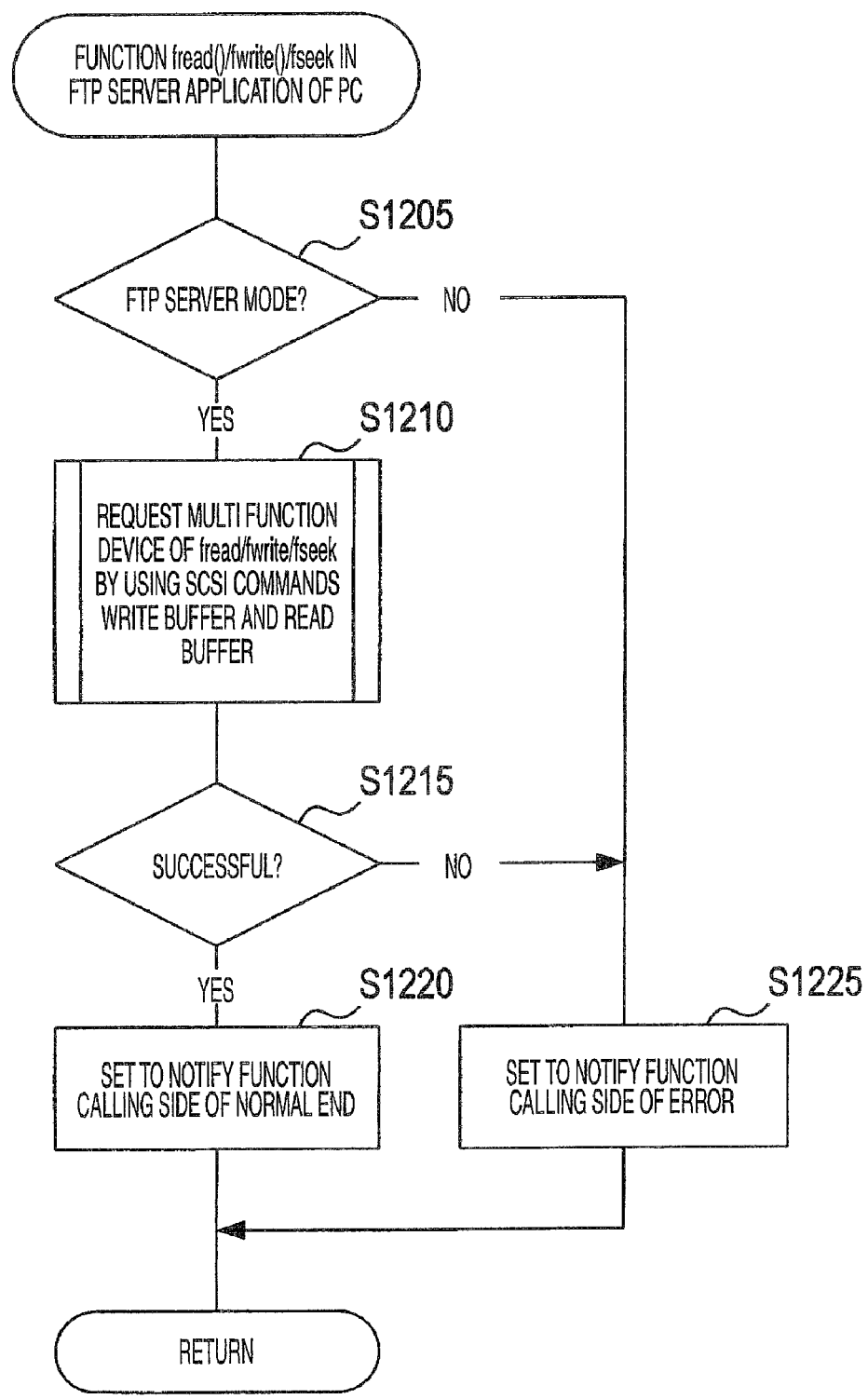
FIG. 18 is a flowchart of fread( )/fwrite( )/fseek( ) functions in the FTP server application.

Next, a processing to be executed by the PC 2 when the function fread( )/fwrite( )/fseek( ) in the FTP server application 281 is called will be described with reference to a flowchart shown in FIG. 18.

When the function fread( )/fwrite( )/fseek( ) in the FTP server application 281 is called, the PC 2 first determines whether or not the multi function device 1 is in the FTP server mode (S1205).

When the multi function device 1 is in the FTP server mode (S1205: Yes), fread/fwrite/fseek is requested from the multi function device 1 by using the SCSI commands "Write Buffer" and "Read Buffer" (S1210).

Specifically, in S1210, an indication for requesting fread/fwrite/fseek is transmitted to the multi function device 1 by the "Write Buffer" command. When receiving this command, the multi function device 1 executes a processing corresponding to the function fread( )/fwrite( )/fseek( ) by using the file unit input/output task 161 according to the procedure shown in FIGS. 8 and 9. Then, in S1210, the result of the processing in the multi function device 1 is acquired by the "Read Buffer" command.

If S1210 is ended, the PC 2 determines whether or not the processing in the multi function device 1 is successful (S1215). When the processing is successful (S1215: Yes), setting to notify the function calling side of normal end is performed (S1220), and then the processing shown in FIG. 18 is ended.

When it is determined in S1215 that the processing in the multi function device 1 is failed (S1215: No) or when it is determined in S1205 that the multi function device 1 is not in the FTP server mode (S1205: Yes), setting to notify the function calling side of an error is performed (S1225), and then the processing shown in FIG. 18 is ended.

With this processing, the PC 2 can execute fread/fwrite/fseek on a file in the multi function device 1 through the file system task 163 of the multi function device 1, not through the file system 231.

(Function flist( ) in FTP Server Application)

Next, a processing to be executed by the PC 2 when the function flist( ) in the FTP server application 281 is called will be described with reference to a flowchart shown in FIG. 19.

When the function flist( ) in the FTP server application 281 is called, the PC 2 first determines whether or not the multi function device 1 is in the FTP server mode (S1305).

If the multi function device 1 is in the FTP server mode (S1305: Yes), flist is requested from the multi function device 1 by using the SCSI commands "Write Buffer" and "Read Buffer" (S1310).

Specifically, in S1310, an indication for requesting flist is transmitted to the multi function device 1 by the "Write Buffer" command. When receiving this command, the multi function device 1 executes a processing corresponding to the function flist( ) by using the file unit input/output task 161 according to the procedure shown in FIGS. 8 and 9. Then, in S1310, the result of the processing in the multi function device 1 is acquired by the "Read Buffer" command.

Figure 19:
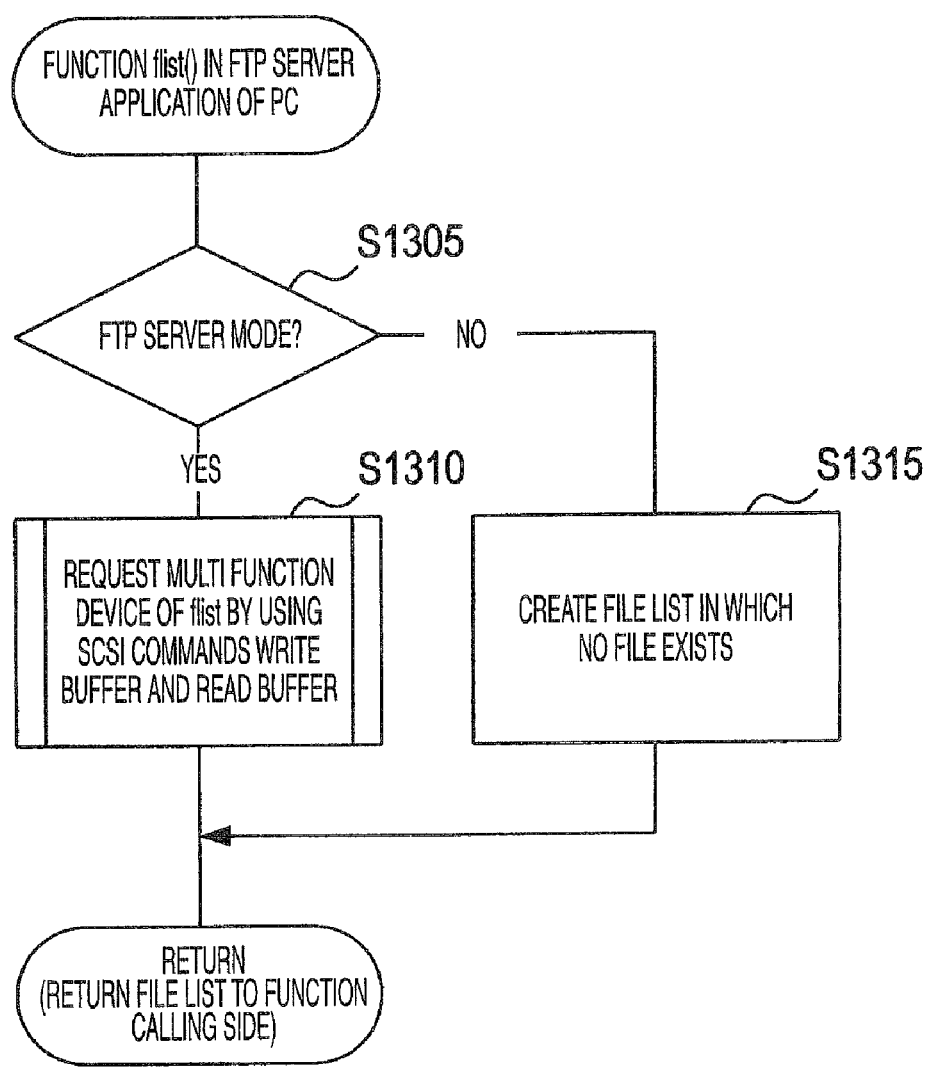
FIG. 19 is a flowchart of a flist( ) function in the FTP server application.

If S1310 is ended, the processing shown in FIG. 19 is ended and a file list is returned to the function calling side.

When it is determined in S1305 that the multi function device 1 is not in the FTP server mode (S1305: No), a file list in which no file exists is created (S1315), the processing shown in FIG. 19 is ended, and the file list is returned to the function calling side.

With this processing, the PC 2 executes flist on a file in the multi function device 1 through the file system task 163 of the multi function device 1, not through the file system 231.

(Advantage of First Embodiment)

As described above, according to the multi function device 1, the multi function device 1 is switched between the USB mode and the FTP mode according to the instruction from the PC 2. Then, when the multi function device 1 is switched to the USB mode, the first memory slot 151, the second memory slot 152, the third memory slot 153, and the fourth memory slot 154 in the multi function device 1 can be recognized and used by the PC 2 as a USB storage device.

Therefore, various applications compliant with the USB storage device can access the files on the card mounted to the first memory slot 151, the second memory slot 152, the third memory slot 153, and the fourth memory slot 154.

In addition, when the multi function device 1 is switched to the FTP mode, an exclusive-use application compliant with the multi function device 1 (for example, the FTP server application 281) can access the files on the card mounted to the first memory slot 151, the second memory slot 152, the third memory slot 153, and the fourth memory slot 154.

Furthermore, the exclusive-use application compliant with the multi function device 1 (for example, the FTP server application 281) accesses the files on the card through the file system task 163 of the multi function device 1, thereby performing an access in file unit.

That is, unlike various applications compliant with the USB storage device, which access the files on the card through the file system 231 of the PC 2, the FTP server application 281 does not access the files on the card in physical sector unit.

In such an FTP server application 281, the multi function device 1 can manage file access start (fopen) and access end (fclose). For this reason, the FTP server application 281 can perform file access through the file system task 163 on even ground with the above-described medium print function 171 or the like. Then, if file access is ended, the file system task 163 may immediately release the right of use of the memory slot control task 145.

For this reason, unlike the USB storage device that uses the physical sector unit input/output task 143, there is no case in which it takes a lot of time to release the right of use of the memory slot control task 145 due to S250 and S255, and thus a wasteful occupation time of the memory slot control task 145 can be reduced.

Therefore, as for the access request from the PC 2 and the access request from a data processing section in the device (the media print function 171 or the FTP server task 173), immediately after one access request is processed, the other one can be processed. As a result, a rapid processing can be achieved.

Furthermore, even if the access request from the PC 2 and the access request from the data processing section in the device are simultaneously generated, these requests are both managed and processed by the file system task 163 in the device.

For this reason, unlike a case in which input/output in physical sector unit and input/output through the file system task are simultaneously generated, even if a plurality of access requests are generated, there is no problem. These requests may be processed seemingly simultaneously or in parallel under the control of the file system task 163.

Therefore, as described above, if the access request from the PC 2 and the access request from the data processing section in the device are configured to be both managed by the file system task 163, there is no case in which the medium print function 171 or the FTP server task 173 stands by due to the access request from the PC 2. As a result, there is a high possibility that the medium print function 171 or the FTP server task 173 accesses the files on the card mounted to the first memory slot 151, the second memory slot 152, the third memory slot 153, and the fourth memory slot 154.

Furthermore, even if the multi function device 1 is switched to one of the USB mode and the FTP mode, the PC 2 can access the multi function device 1 through a single USB interface.

Therefore, exclusive-use communication interfaces do not need to be provided separately for the USB mode and the FTP mode. As a result, hardware for a communication interface required in the multi function device 1 or the PC 2 can be reduced, and thus hardware can be simplified.

(2) Second Embodiment

Next, a second embodiment will be described.

In the second embodiment, instead of the FTP server in the first embodiment, a server application other than the FTP service is used.

That is, in the foregoing embodiment, the FTP server application 281 is provided in the PC 2 to function as the FTP server, and accesses the files in the multi function device 1 according to the request from the FTP client, but a protocol other than the FTP protocol may be used insofar as a file can be transmitted.

For example, instead of the FTP server, an HTTP (HyperText Transfer Protocol) server or a CIFS (Common Internet File System) server may be used. Hereinafter, a case in which a CIFS server is used will be described.

Figure 20:
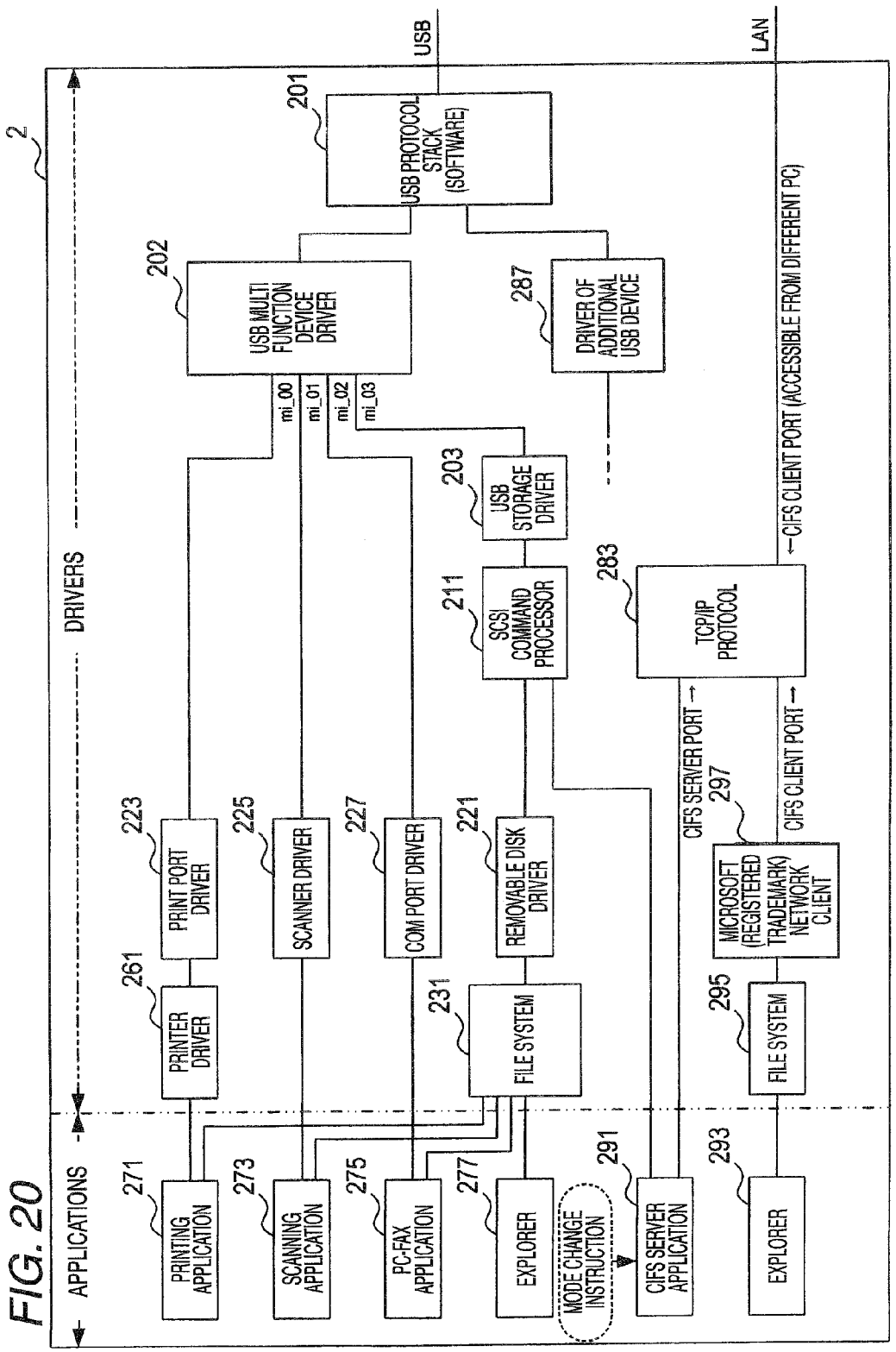
FIG. 20 is a block diagram showing the internal configuration of a PC according to a second embodiment of the invention.

When the CIFS server is used, as shown in FIG. 20, a CIFS server application 291, instead of the FTP server application 281, is provided in the PC 2. Then, an access to the CIFS server application 291 is performed by using a CIFS client (for example, an explorer 293) on the client computer through a TCP/IP protocol 283, while passing through a file system 295, a Microsoft (Registered Trademark) network client 297.

The CIFS server application 291 is provided with a "file access function to the multi function device 1", like the FTP server application 281. Accordingly, the CIFS server application 291 can access the files in the multi function device 1 according to a request from the CIFS client. With this configuration, the same advantages as the above-described first embodiment can be obtained.

In the second embodiment, the CIFS server, instead of the FTP server, is used, but if necessary, both the FTP server and the CIFS server may be used. In this case, in addition to the USB mode and the FTP mode in the first embodiment, a CIFS mode is further provided.

Figure 21A:
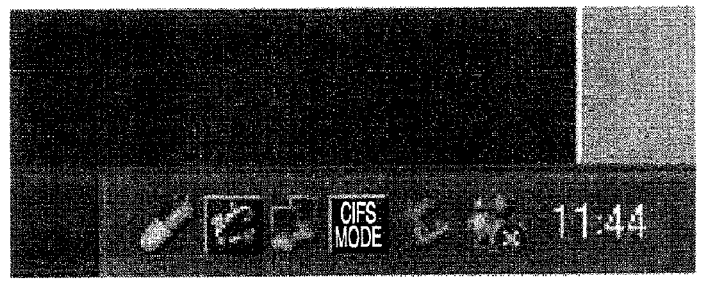
FIGS. 21A and 21B are explanatory views of an icon to be displayed on the PC according to the second embodiment of the invention.

Similarly to the foregoing embodiment, these modes may be displayed on the display section of the PC 2 by icons. Specifically, when the multi function device 1 is in the CIFS mode, as shown in FIG. 21A, the current mode of the multi function device 1 may also be displayed on the display section of the PC 2.

Figure 21B:
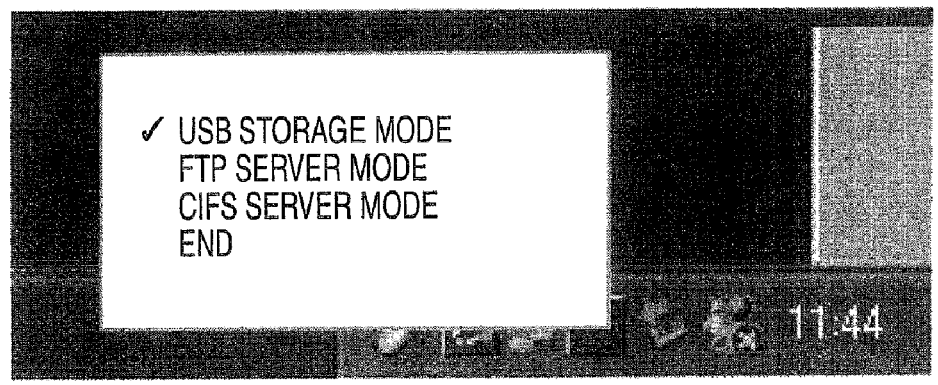

Similarly to the foregoing embodiment, if this icon is clicked by the pointing device as shown in FIG. 21B, a popup window may be displayed. In addition, similarly to the foregoing embodiment, the user may instruct the mode change or application end by a click operation.

(3) Third Embodiment

Next, a third embodiment will be described.

In the foregoing first and second embodiments, as an example of the device which is recognized as a USB storage device by the PC 2, the multi function device 1 is used. However, according to the invention, a device other than the multi function device 1 may be used insofar as it is a device which is recognized as a USB storage device.

In particular, the multi function device 1 is recognized by the PC 2 as a USB multi function device, and one of a plurality of logical units in the USB multi function device is a USB storage device, but whether or not the multi function device 1 is recognized as a USB multi function device may be arbitrarily set.

That is, when the multi function device 1 is recognized as a USB storage device constituted from a single logical unit, not a USB multi function device, the invention may be applied. Alternatively, a USB storage device may include a plurality of logical units, which are identified by the LUN (Logical Unit Number) based on the USB standard, not a single logical unit. The invention may also be applied to such a device.

In the following third embodiment, as an example of a device which is recognized as a USB storage device constituted from a single logical unit, a digital camera (digital still camera) will be described.

Figure 22:
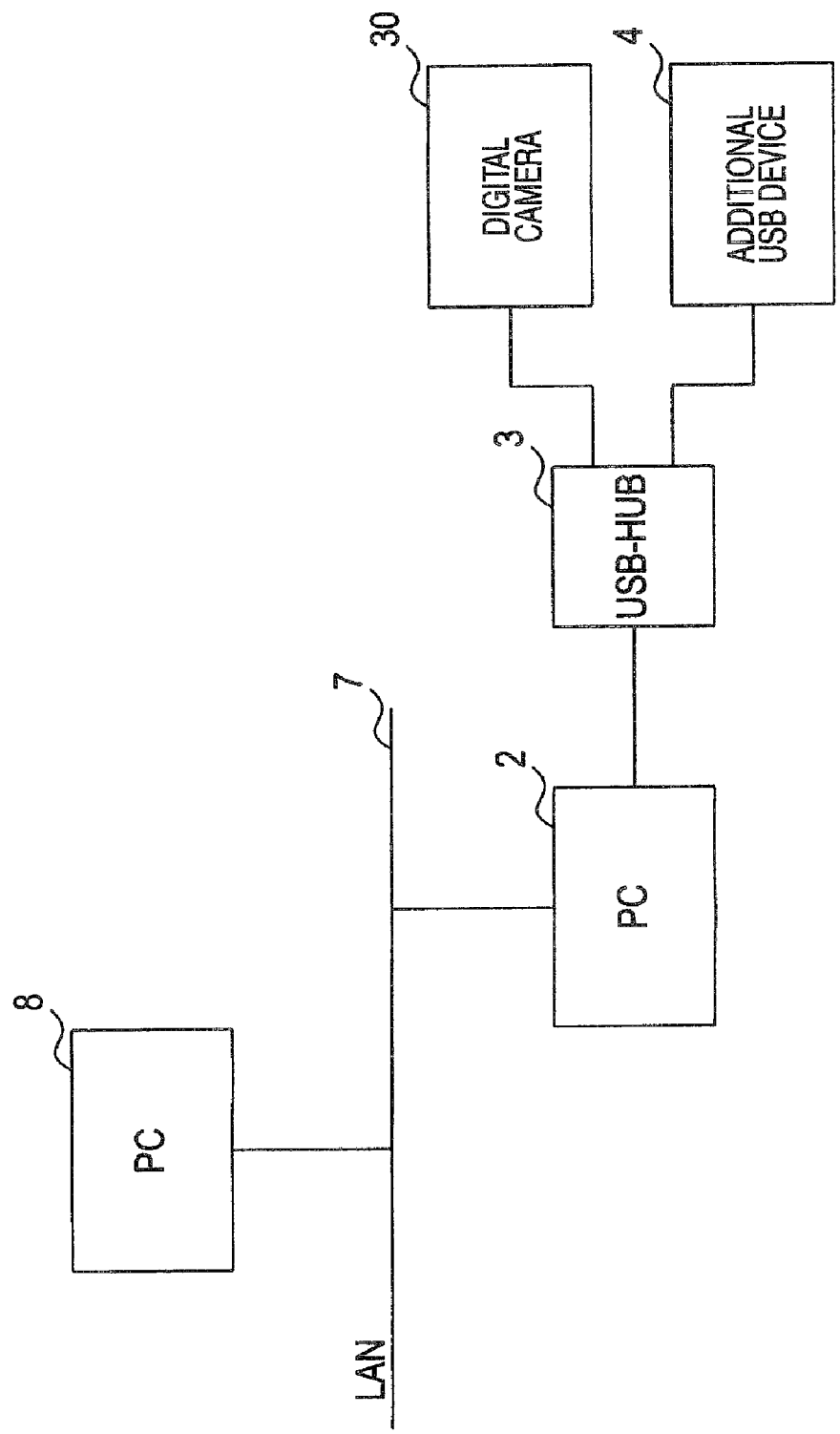
FIG. 22 is a block diagram showing an entire file transfer system according to a third embodiment of the invention.
Figure 23:
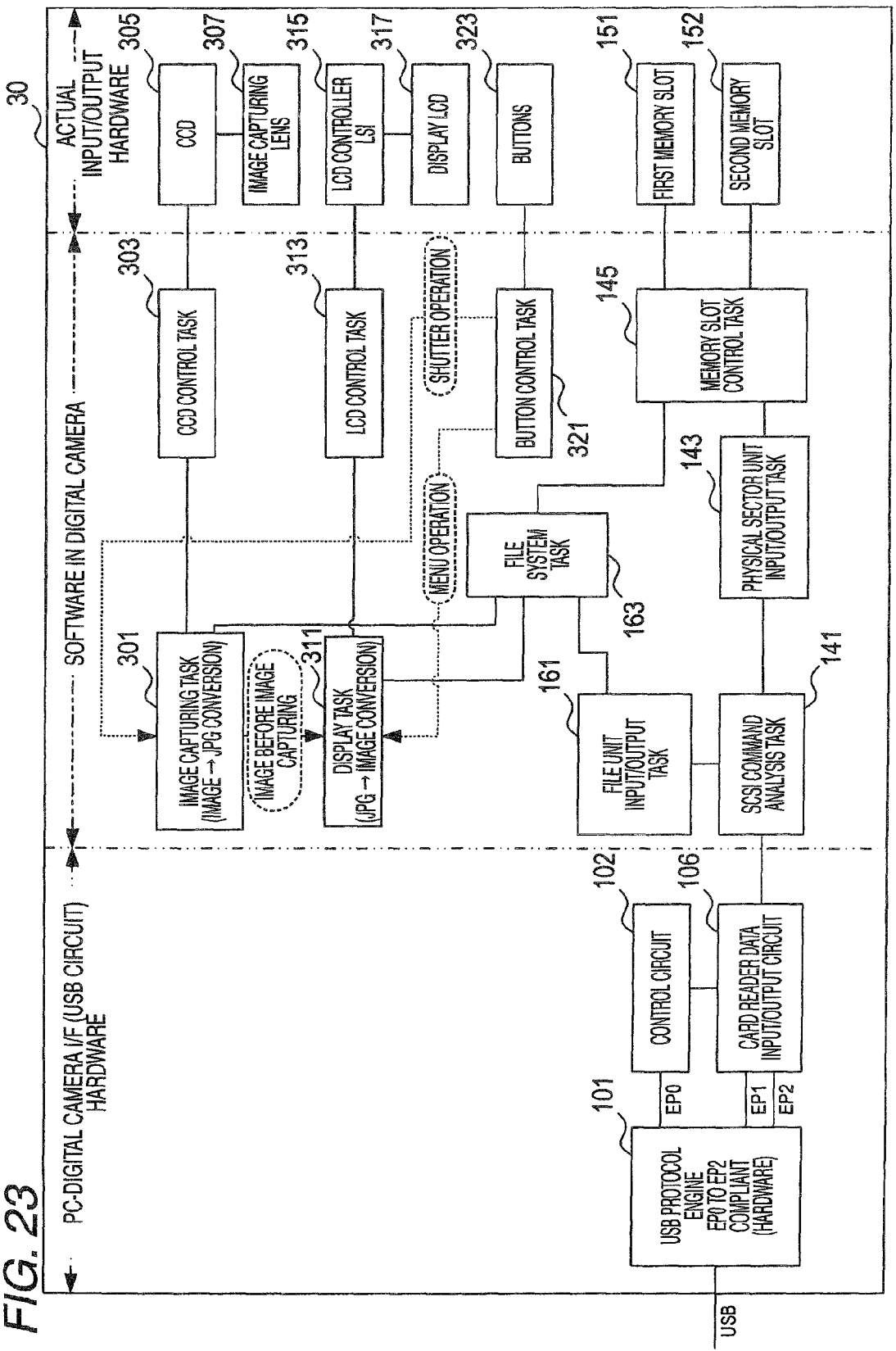
FIG. 23 is a block diagram showing the internal configuration of a digital camera.
Figure 24:
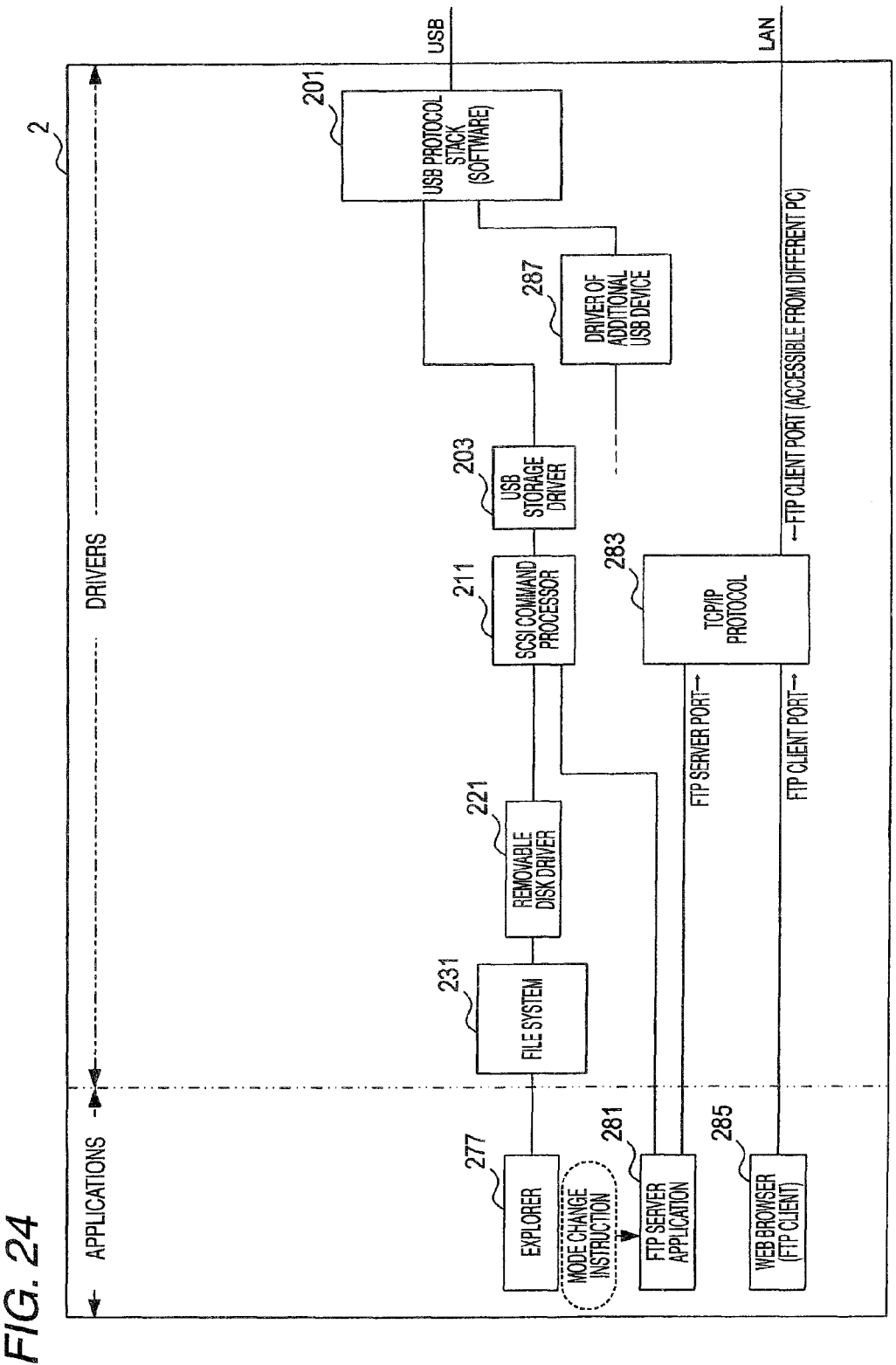
FIG. 24 is a block diagram showing the internal configuration of a PC when a digital camera is connected.

Similarly to the above-described multi function device 1, a digital camera 30 shown in FIG. 22 is connectable to the PC 2 through a USB interface (in FIG. 22, a USB-HUB 3).

Specifically, the digital camera 30 includes a USB protocol engine 101, a control circuit 102, a card reader data input/output circuit 106, a SCSI command analysis task 141, a physical sector unit input/output task 143, a memory slot control task 145, a first memory slot 151, and a second memory slot 152.

These have the substantially same functions as those of the multi function device 1, which are represented by the same reference numerals. With this configuration, the digital camera 30 can function as a USB storage device.

The digital camera 30 further includes an image capturing system including an image capturing task 301, a CCD control task 303, a CCD 305, and an image capturing lens 307, a display system including a display task 311, an LCD control task 313, an LCD controller LSI 315, and a display LCD 317, and an operation system including a button control task 321 and buttons 323.

When data captured by the image capturing system is write to a memory card mounted to the first memory slot 151 or the second memory slot 152, an access in file unit through the file system task 163 is performed.

When data read from the memory card mounted to the first memory slot 151 or the second memory slot 152 is displayed by the display system, an access in file unit through the file system task 163 is also performed.

The image capturing system, the display system, and the operation system, or the file system in the digital camera is well known and used in a general digital camera.

In addition to the above-described configuration, the digital camera 30 further includes a file unit input/output task 161. The file unit input/output task 161 has the same function as that in the multi function device 1, which is represented by the same reference numeral. Accordingly, the digital camera 30 can be operated in the FTP server mode, similarly to the multi function device 1.

That is, as will be apparent from the comparison between the configuration of the digital camera 30 and the configuration of the multi function device 1, similarly to the multi function device 1, the digital camera 30 can be switched between the USB storage mode and the FTP server mode.

If the digital camera 30 is connected to the PC 2, in the PC 2, a USB protocol stack 201, a USB storage driver 203, a SCSI command processor 211, a removable disk driver 221, and a file system 231 are operated.

Accordingly, when the digital camera 30 is switched to the USB storage mode, similarly to the multi function device 1, the digital camera 30 can be used as a USB storage device. Specifically, an access to the files in the digital camera 30 is performed by software, such as the explorer 277.

In addition, in the PC 2, a FTP server application 281 and a TCP/IP protocol 283 are operated. Therefore, when the digital camera 30 is switched to the FTP server mode, the digital camera 30 also operates, similarly to the multi function device 1.

That is, when an access request from the WEB browser 285 serving as the FTP client is received, a file access request can be issued from the FTP server application 281 to the digital camera 30.

In general, in a digital camera which is recognized as a USB storage device when being connected to the PC, if it is connected to the PC, an image capturing function or a photograph display function is disabled, and only a function as a USB storage device (card reader function) is enabled. For this reason, when the user wants to use the image capturing function or the photography display function, the digital camera needs to be disconnected from the PC.

In contrast, in case of the digital camera 30, if it is switched to the FTP server mode, while a file access from the PC 2 is permitted (that is, the card reader function is available) in a state in which the digital camera 30 is connected to the PC 2, the image capturing function or the photography display function can also be used.

(4) Fourth Embodiment

In a fourth embodiment, as an example of a device which is recognized as a USB storage device constituted from a single logical unit, an MP3 player (portable audio player) will be described.

Figure 25:
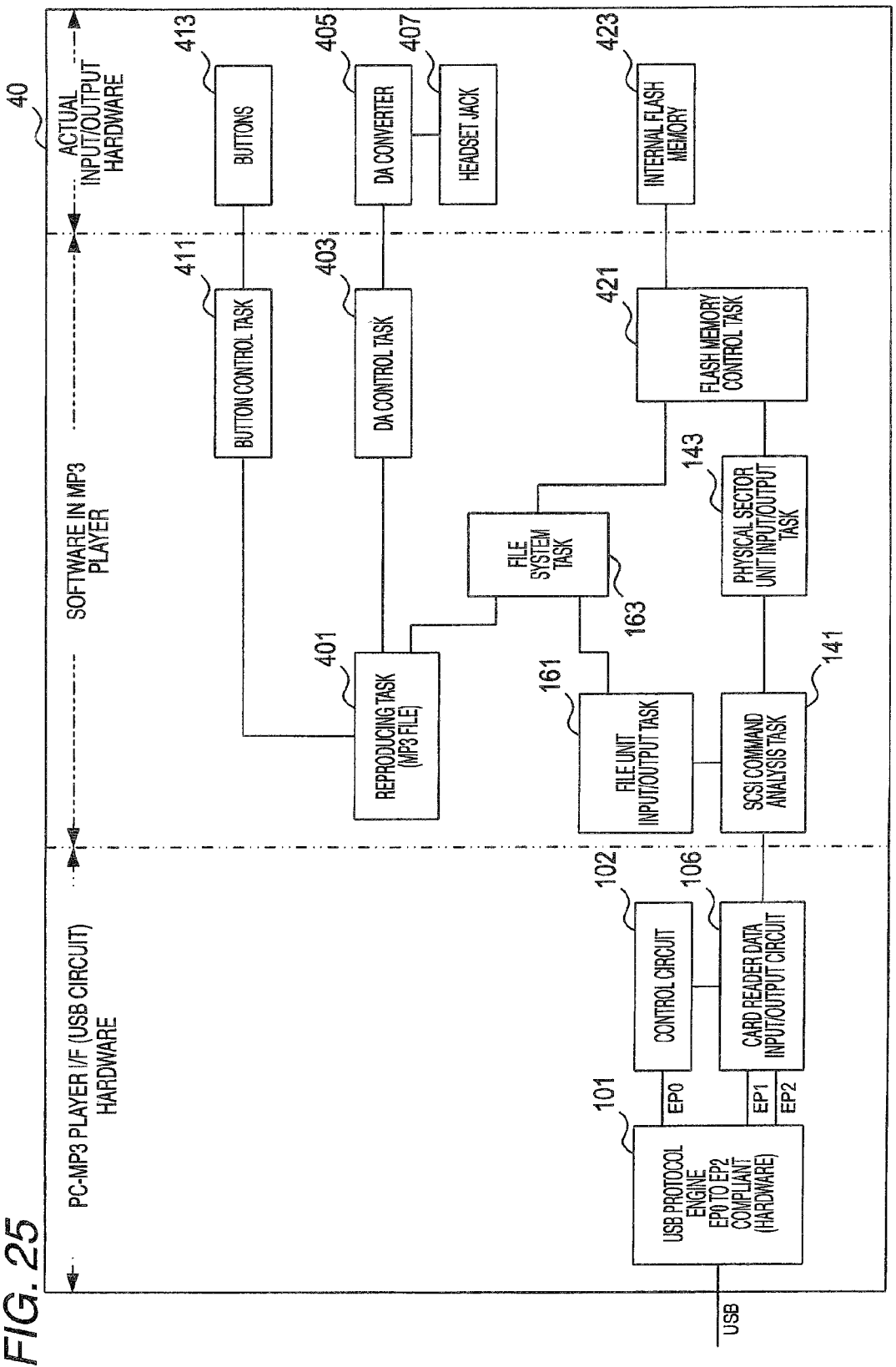
FIG. 25 is a block diagram showing the internal configuration of a MP3 player according to a fourth embodiment of the invention.

FIG. 25 is a block diagram showing the internal configuration of an MP3 player 40. Similarly to the multi function device 1 or the digital camera 30, the MP3 player 40 includes a USB protocol engine 101, a control circuit 102, a card reader data input/output circuit 106, a SCSI command analysis task 141, and a physical sector unit input/output task 143. These have the substantially same functions as those in the multi function device 1 or the digital camera 30, which are represented by the same reference numerals.

The MP3 player 40 further includes a reproducing system including a reproducing task 401, a DA control task 403, a DA converter 405, and a headset jack 407, and an operation system including a button control task 411 and buttons 413.

The MP3 player 40 further includes a flash memory control task 421 and an internal flash memory 423. These correspond to the memory slot control task 145 and the first memory slot 151 or the second memory slot 152 in the multi function device 1 or the digital camera 30. A difference from the multi function device 1 or the digital camera 30 is that attachment/detachment of the memory card is impossible.

The MP3 player 40 can also function as a USB storage device when being connected to the PC 2. In addition, when data read from the internal flash memory 423 is reproduced by the reproducing system, an access in file unit through the file system task 163 is performed.

In addition to the above-described configuration, the MP3 player 40 further includes a file unit input/output task 161. The file unit input/output task 161 has the same function as that in the multi function device 1 or the digital camera 30, which is represented by the same reference numeral. Therefore, the MP3 player 40 can be operated in the FTP server mode, similarly to the multi function device 1.

That is, as will be apparent from the comparison between the configuration of the MP3 player 40 and the configuration of the multi function device 1, the MP3 player 40 can also be switched between the USB storage mode and the FTP server mode, similarly to the multi function device 1 or the digital camera 30.

In general, in an MP3 player which is recognized as a USB storage device when being connected to the PC, if it is connected to the PC, a music reproducing function is disabled, and only a function as a USB storage device (card reader function) is enabled. For this reason, when the user wants to use the music reproducing function, the MP3 player needs to be disconnected from the PC.

In contrast, in the MP3 player 40, if it is switched to the FTP server mode, while a file access from the PC 2 is permitted (that is, the card reader function is available) in a state in which the MP3 player is connected to the PC 2, the music reproducing function can also be used.

(5) Modifications

Although the embodiments of the invention have been described, the invention is not limited to the embodiments, and various changes and modifications may he made.

In the first and second embodiments, the multi function device is used as a device which is recognized as a USB multi function device when being connected to the PC, and in the third and fourth embodiments, the digital camera and the MP3 player are used as a device which is recognized as a USB storage device when being connected to the PC, respectively. However, the invention can be applied to devices having other functions. For example, the invention may be applied to an IC recorder or a cellular phone.

In the first embodiment, the FTP server application 281 issues an access request when the multi function device 1 is in the FTP mode, and does not issue an access request when the multi function device 1 is in the USB mode, but alternatives may be considered.

For example, the FTP server application 281 may issue an access request, and the multi function device 1 may return an access rejection response. In this case, as an example of the access rejection response, a response indicating that no medium is loaded may be considered.

In the first embodiment, a device which is recognized as a USB storage device is the multi function device 1 to which a removable medium can be mounted. According to the invention, however, a device which is recognized as a USB storage device is not necessarily adapted to mount a removable medium thereto.

Specifically, like the MP3 player 40 according to the fourth embodiment, a device having the internal flash memory 423 may be used. In this case, the internal flash memory 423 may be removably mounted to the MP3 player 40 or not.

In the first embodiment, the WEB browser 285 serving as the FTP client and the FTP server application 281 are installed in the same PC 2, but they may be installed in different PCs which are communicable through a LAN.

That is, if a client computer including the WEB browser 285 serving as the FTP client and a server computer including the FTP server application 281 are communicable through a logical data transmission line according to the TCP/IP, they may be physically the same PC or different PCs. The same is applied to a case in which HTTP or CIFS, instead of FTP, is used.

In the foregoing embodiments, as a specific example of the communication interface capable of transmitting a data string based on the SCSI standard, a USB interface is used. Alternatively, the invention may be applied to a communication interface capable of internally transmitting a data string based on the SCSI standard. In this case, the same advantages as those in the foregoing embodiments can also be obtained.

For example, when an ATAPI-compliant device is connected to an IDE controller, a data string is internally transmitted based on the SCSI standard, and thus it is effective to apply the same configuration as the foregoing embodiments. In addition, an IEEE 1394 interface is configured to internally transmit a data string based on the SCSI standard, and thus it is effective to apply the same configuration as the foregoing embodiments.

What is claimed is:

1. A device that is connectable to a computer through a communication interface capable of transmitting a data string based on SCSI (Small Computer System Interface) standard, and functions as a storage device capable of being controlled by the computer according to SCSI commands defined in the SCSI standard, the device comprising:

a data storage section configured to access a data storable physical storage area, and read data stored in the physical storage area or write data to the physical storage area;

a file system configured to manage data to be stored in the physical storage area of the data storage section as a file, provide an interface for accessing to the file, and enable reading of data stored in the file or writing of data to the file by an access with the interface;

a data processing section configured to execute a predetermined data processing, and during the data processing, access the file through the file system;

a mode switching section configured to, when several kinds of commands previously selected from among the SCSI commands are defined as particular SCSI commands, and other commands than the particular SCSI commands are defined as standard SCSI commands, switch the device to one of a first mode in which an access to the storage device with the standard SCSI commands is permitted and a second mode in which an access to the storage device with the standard SCSI commands is prohibited;

a data analysis section configured to, when an SCSI command from the computer is transmitted through a logical data transmission line between the computer and the storage device, analyze whether the SCSI command is a standard SCSI command or a particular SCSI command;

a mode determination section configured to, when the data analysis section analyzes that the SCSI command is a standard SCSI command, determine which of the first and second modes is selected by the mode switching section;

a physical area unit access section configured to, when the mode determination section determines that the device is switched to the first mode, accesses the physical storage area of the data storage section on the basis of the SCSI command, and transmits response data corresponding to the access to the computer through the data transmission line;

a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the SCSI command is a particular SCSI command, access the file through the file system on the basis of the particular SCSI command, and transmit response data corresponding to the access to the computer through the data transmission line.

2. The device according to claim 1, wherein the communication interface is a USB (Universal Serial Bus) interface.

3. The device according to claim 2, wherein the device is recognized by the computer as a "USB multi function device capable of functioning as multiple devices comprising at least a USB storage device" or a "USB storage device" when being connected to the computer through the USB interface.

4. The device according to claim 1, wherein the data analysis section comprises a file access request determination section configured to determine whether or not the particular SCSI command is a "SCSI command requesting an access to the file", and wherein, when the file access request determination section determines that the particular SCSI command is the "SCSI command requesting an access to the file", the file unit access section accesses the file through the file system, and transmits response data corresponding to the access to the computer through the data transmission line.

5. The device according to claim 4,
wherein, when a SCSI command transmitted from the computer through the data transmission line is one of a "Write Buffer" command and a "Read Buffer" command, the file access request determination section determines that the SCSI command is the "SCSI command requesting an access to the file".

6. The device according to claim 4,
wherein the data analysis section comprises a mode switching request determination section configured to determine whether or not the particular SCSI command is a "SCSI command requesting the mode switching section of mode switching", and
wherein, when the mode switching request determination section determines that the particular SCSI command is the "SCSI command requesting to switch the mode", the mode switching section switches the device to one of the first mode and the second mode on the basis of information in a data string constituting the particular SCSI command.

7. The device according to claim 6,
wherein the mode switching request determination section determines that the SCSI command is the "SCSI command requesting to switch the mode" when a SCSI command transmitted from the computer through the data transmission line indicates:
an "Inquiry" command;
the value of an "EVPD (Enable Vital Product Data)" region in a data string contained in the "Inquiry" command is set to "1";
the value of a "Page Code" region in the data string contained in the "Inquiry" command is set to a prescribed value; and
a prescribed bit of an "Allocation Length" region in the data string contained the "Inquiry" command is set to "1".

8. The device according to claim 1,
wherein the device comprises a multi function device having at least a printer function and a memory card function, and
wherein the data processing section is configured to execute a data processing to print an image on the basis of image data read from a file on a memory card, and during the data processing, access the file through the file system.

9. The device according to claim 1,
wherein the device comprises a digital camera having at least a still image capturing function, and
wherein the data processing section is configured to execute a data processing to write a captured still image to a file on a memory, and during the data processing, access the file through the file system.

10. The device according to claim 1,
wherein the device comprises a portable audio player having at least a music reproducing function, and
wherein the data processing section is configured to execute a data processing to reproduce music based on audio data read from a file on a memory, and during the data processing, access the file through the file system.

11. A file transfer system, comprising:
a computer; and
a device connected to the computer through a communication interface capable of transmitting a data string based on SCSI (Small Computer System Interface) standard, and configured to function as a storage device capable of being controlled by the computer according to SCSI commands defined in the SCSI standard,
wherein the device comprises:
a data storage section configured to access a data storable physical storage area, and read data stored in the physical storage area or write data to the physical storage area;
a file system configured to manage data to be stored in the physical storage area of the data storage section as a file, provide an interface for accessing to the file, and enable reading of data stored in the file or writing of data to the file by an access with the interface;
a data processing section configured to execute a predetermined data processing, and during the data processing, access the file through the file system;
a mode switching section configured to, when several kinds of commands previously selected from among the SCSI commands are defined as particular SCSI commands, and other commands than the particular SCSI commands are defined as standard SCSI commands, switch the device to one of a first mode in which an access to the storage device with the standard SCSI commands is permitted and a second mode in which an access to the storage device with the standard SCSI commands is prohibited;
a data analysis section configured to, when an SCSI command from the computer is transmitted through a logical data transmission line between the computer and the storage device, analyze whether the SCSI command is a standard SCSI command or a particular SCSI command;
a mode determination section configured to, when the data analysis section analyzes that the SCSI command is a standard SCSI command, determine which of the first and second modes is selected by the mode switching section;
a physical area unit access section configured to, when the mode determination section determines that the device is switched to the first mode, accesses the physical storage area of the data storage section on the basis of the SCSI command, and transmits response data corresponding to the access to the computer through the data transmission line;
a pseudo response section configured to, when the mode determination section determines that the device is switched to the second mode, transmit a pseudo response to the computer through the data transmission line, the pseudo response indicating that no storage medium is mounted to the data storage section; and
a file unit access section configured to, when the data analysis section analyzes that the SCSI command is a particular SCSI command, access the file through the file system on the basis of the particular SCSI command, and transmit response data corresponding to the access to the computer through the data transmission line, and
wherein the computer comprises a server computer that is capable of transmitting a file to a client computer having a client function, and on the basis of an access request from the client computer, the computer is configured to transmit the access request to the file unit access section provided in the device through the data transmission line and to transmit the response data from the device according to the access request to the client computer.

* * * * *